US010785604B1

(12) United States Patent
Kumar et al.

(10) Patent No.: US 10,785,604 B1
(45) Date of Patent: Sep. 22, 2020

(54) MULTI-COMPUTER PROCESSING SYSTEM FOR DYNAMICALLY EXECUTING RESPONSE ACTIONS BASED ON MOVEMENT DATA

(71) Applicant: Allstate Insurance Company, Northbrook, IL (US)

(72) Inventors: Surender Kumar, Palatine, IL (US); Sunil Chintakindi, Menlo Park, CA (US); Howard Hayes, Glencoe, IL (US); Tim Gibson, Barrington, IL (US); Soton Ayodele Rosanwo, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/523,308

(22) Filed: Jul. 26, 2019

(51) Int. Cl.
*G06K 9/00* (2006.01)
*H04W 4/029* (2018.01)
*G06K 9/62* (2006.01)
*H04W 4/44* (2018.01)

(52) U.S. Cl.
CPC ........ *H04W 4/029* (2018.02); *G06K 9/00838* (2013.01); *G06K 9/6201* (2013.01); *H04W 4/44* (2018.02)

(58) Field of Classification Search
CPC .... H04W 4/029; H04W 4/44; G06K 9/00832; G06K 9/00845; G06K 9/6201; G06K 9/00838; G06Q 40/08; B06W 40/08; B06W 40/09
See application file for complete search history.

(56) References Cited

U.S. PATENT DOCUMENTS

| 2011/0276401 | A1* | 11/2011 | Knowles | G06Q 30/0269 705/14.58 |
|---|---|---|---|---|
| 2014/0256303 | A1* | 9/2014 | Jones | H04W 4/027 455/418 |
| 2014/0370869 | A1* | 12/2014 | Naqvi | H04W 4/40 455/418 |
| 2016/0094707 | A1* | 3/2016 | Stuntebeck | H04M 1/72577 455/418 |
| 2018/0093631 | A1* | 4/2018 | Lee | B60W 30/095 |

\* cited by examiner

*Primary Examiner* — Marcus Hammonds
(74) *Attorney, Agent, or Firm* — Banner & Witcoff, Ltd.

(57) ABSTRACT

Methods, computer-readable media, systems, and/or apparatuses for evaluating movement data to identify a user as a driver or non-driver passenger are provided. In some examples, movement data may be received from a mobile device of a user. The movement data may include sensor data including location data, such as global positioning system (GPS) data, accelerometer and/or gyroscope data, and the like. Additional data may be retrieved from one or more other sources. For instance, additional data such as usage of applications on the mobile device, public transportation schedules and routes, image data, vehicle operation data, and the like, may be received and analyzed with the movement data to determine whether the user of the mobile device was a driver or non-driver passenger of the vehicle. Based on the determination, the data may be deleted in some examples or may be further processed to generate one or more outputs.

17 Claims, 14 Drawing Sheets

US 10,785,604 B1

MULTI-COMPUTER PROCESSING SYSTEM FOR DYNAMICALLY EXECUTING RESPONSE ACTIONS BASED ON MOVEMENT DATA

TECHNICAL FIELD

Aspects of the disclosure generally relate to one or more computer systems, servers, and/or other devices including hardware and/or software. In particular, aspects of the disclosure generally relate to determining whether movement data of a user device corresponds to movement of the user device when the user is a driver or a non-driver passenger in a vehicle.

BACKGROUND

Entities are using mobile device data to increasingly personalize services provided to users. Many entities are using mobile device data, with permission of the associated user, to evaluate user behaviors, movement, and the like, to generate customized or personalized outputs for the user. Entities are also looking for ways to improve the accuracy of the data and analysis performed on the data. Accordingly, in arrangements in which movement data is used to evaluate, for example, driving behaviors of a user, it is important to accurately determine whether the user was a driver of the vehicle or a non-driver passenger in order to accurately evaluate driving behaviors and generate outputs.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to efficient, scalable, methods, computer-readable media, systems, and apparatuses for evaluating movement data captured by a mobile device to determine whether a user associated with the mobile device was a driver of a vehicle during the time period of the data or was a non-driver passenger in the vehicle. For instance, movement data may be received from a mobile device of a user. The movement data may include sensor data including location data, such as global positioning system (GPS) data, accelerometer and/or gyroscope data, and the like. Additional data may be retrieved from one or more other sources. For instance, additional data such as usage of applications on the mobile device, public transportation schedules and routes, image data, vehicle operation data, and the like, may be received and analyzed with the movement data to determine whether the user of the mobile device was a driver or non-driver passenger of the vehicle. Based on the determination, the data may be deleted in some examples or may be further processed to generate one or more outputs.

These and other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that can be practiced. It is to be understood that other embodiments can be utilized. As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment or an embodiment combining software and hardware aspects. Furthermore, such aspects can take the form of a computer program product stored by one or more computer-readable storage media having computer-readable program code, or instructions, embodied in or on the storage media. Any suitable computer readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

One or more aspects described herein may be related to evaluating movement data associated with a mobile device of a user to determine whether the user was a driver or non-driver passenger at the time the movement data was captured. For instance, user data (e.g., real-time or near real-time user data) may be used to evaluate user behaviors, such as a driving behaviors, in order to evaluate risk associated with a user, determine insurance premiums or rates for traditional policies, determine consumption rates for usage-based policies, and the like. However, all captured movement data might not correspond to a user driving a vehicle, which may be the pertinent data for, for example, auto insurance. Instead, a user may, at times, be a passenger in a car, riding public transportation, walking, or the like. Accordingly, arrangements described herein use additional data, such as mobile device usage data, public transportation schedule and route data, image data, and the like, to identify when a user is a driver or a non-driver passenger so that relevant data may be used in the analysis to generate one or more outputs.

These and other aspects will be described more fully herein.

Figure 1A:
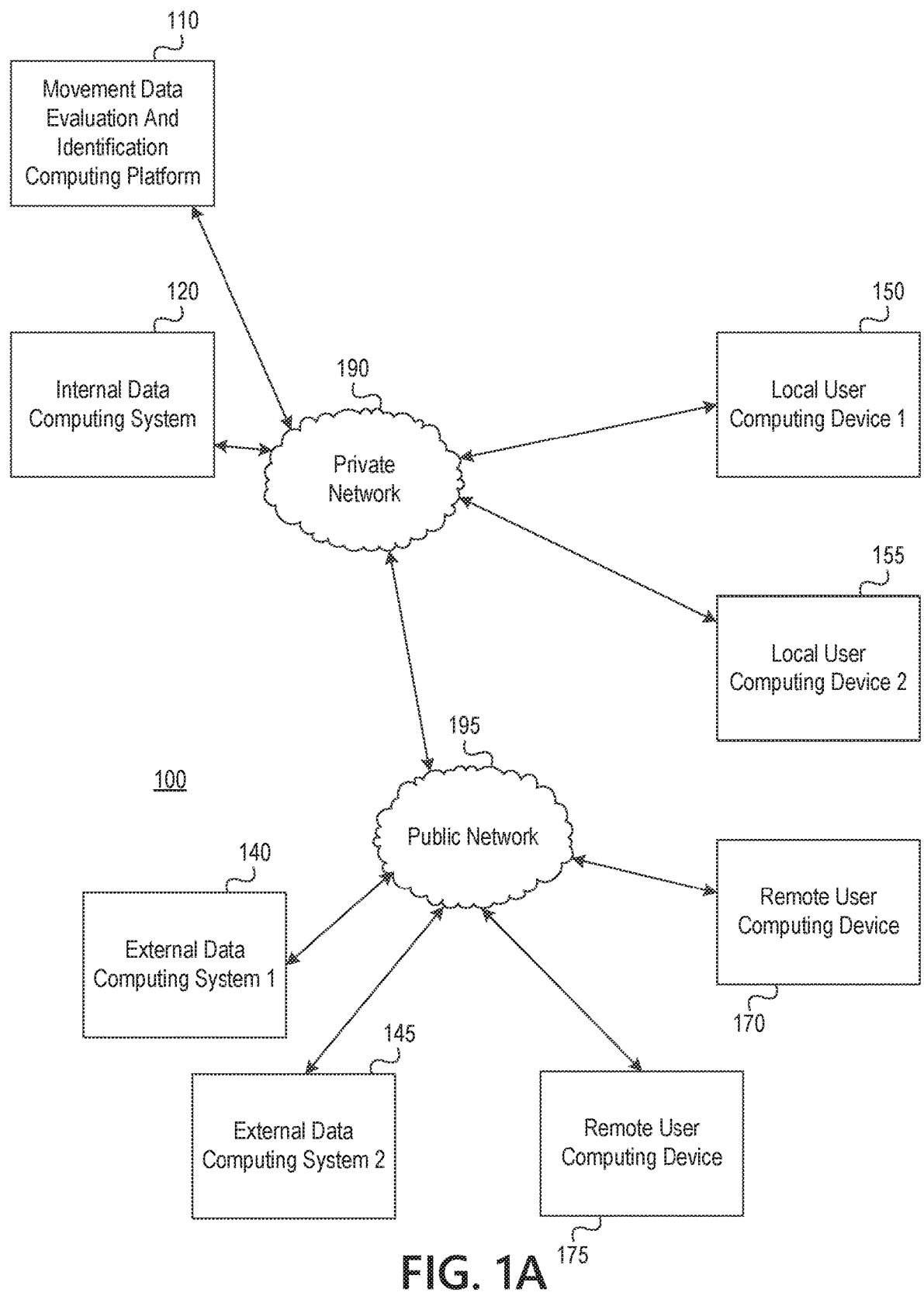
FIGS. 1A and 1B illustrate an illustrative computing environment for implementing movement data evaluation and identification functions, according to one or more aspects described herein.
Figure 1B:
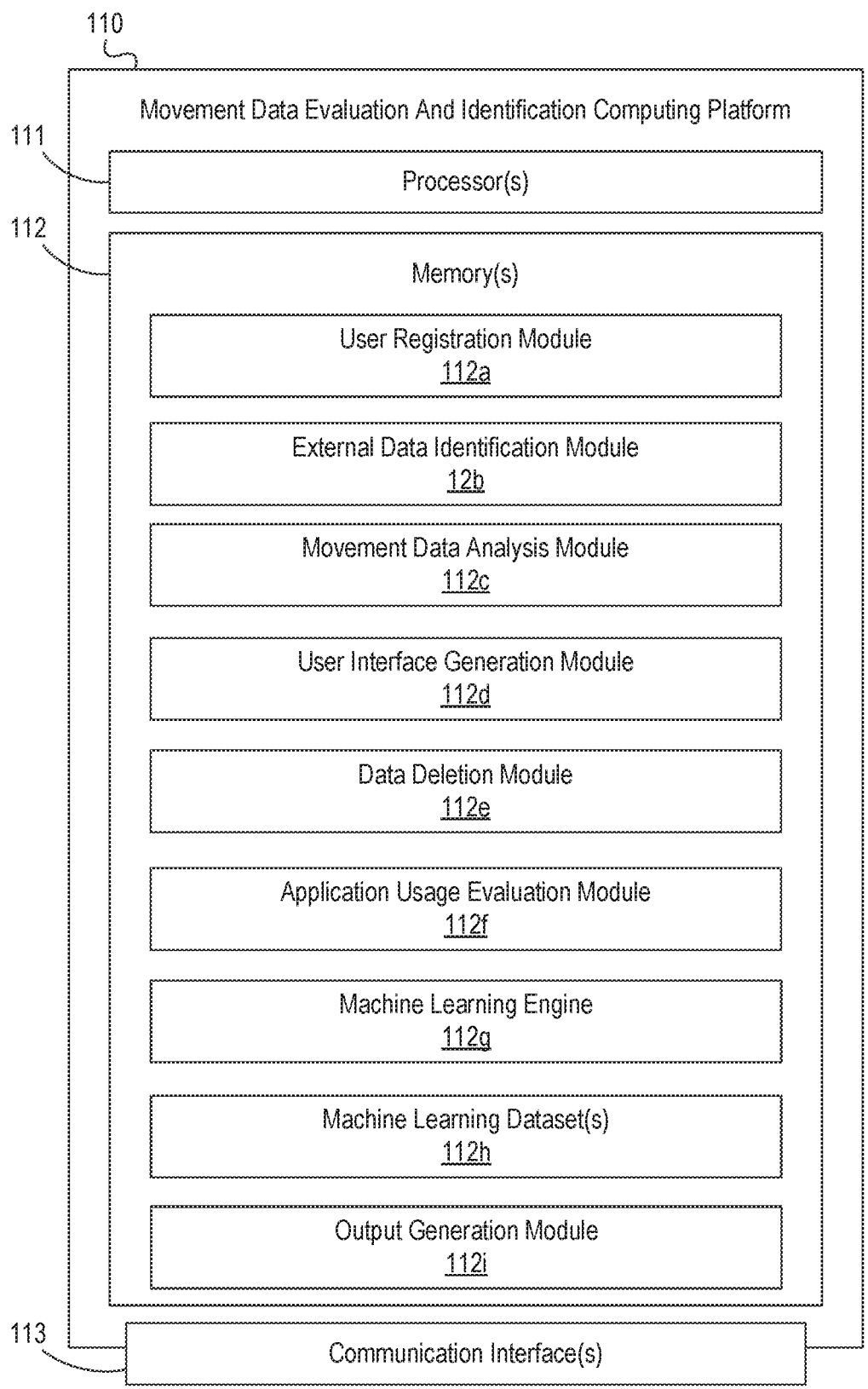

FIGS. 1A-1B depict an illustrative computing environment for implementing and using a movement data evaluation and identification system in accordance with one or more aspects described herein. Referring to FIG. 1A, computing environment 100 may include one or more computing devices and/or other computing systems. For example, computing environment 100 may include movement data evaluation and identification computing platform 110, an internal data computing system 120, a first local user computing device 150, a second local user computing device 155, a first external data computing system 140, a second external data computing system 145, a remote user computing device 170, and a remote user computing device 175.

Movement data evaluation and identification computing platform 110 may be configured to host and/or execute one or more modules including instructions for providing movement data evaluation and identification functions. In some examples, movement data evaluation and identification computing platform 110 may be configured to receive movement data from, for example, one or more remote user computing devices 170, 175. In some examples, the remote user computing devices 170, 175, may be mobile devices associated with one or more users. As a user carries his or her mobile device throughout the day, sensors within the mobile device may capture movement data associated with movement of the mobile device. For instance, location data (e.g., based on GPS data), accelerometer data, and the like, may be captured by one or more sensors in the mobile device. The sensor data may be transmitted to the movement data evaluation and identification computing platform 110 and may be evaluated to determine whether the captured movement data corresponds to movement of the mobile device while the user is a driver of a vehicle or while the user is a non-driver passenger of the vehicle.

In some examples, the movement data evaluation and identification computing platform 110 may evaluate applications executing on the mobile device during a time period corresponding to movement data. For instance, a time stamp on the movement data may be used to identify one or more applications executing on the mobile device at the corresponding time, determine a category of application or type of application, and, based on the determined executing application and/or category or type of application, determine whether the movement data corresponds to movement associated with the user as a driver or non-driver passenger.

In another example, the movement data may be compared to known bus, train or other public transportation routes and schedules. For instance, stoppage points within the movement data may be identified (e.g., points at which speed of a vehicle is below a threshold, points at which a location does not change for at least a threshold period of time, or the like). Those stoppage points, or a pattern of points, may be compared to known public transportation routes with predefined stoppage points. If the stoppage points align, the user is likely a non-driver passenger of the vehicle.

Various other examples for evaluating movement data to determine whether it corresponds to movement associated with a driver or non-driver passenger will be discussed more fully herein.

If the movement data evaluation and identification computing platform 110 determines that the movement data corresponds to movement of a driver, the data may be stored and further processed to generate one or more outputs, such as an insurance rate or premium, discount, consumption rate when usage-based insurance is used, or the like.

Alternatively, if the movement data evaluation and identification computing platform 110 determines that the movement data corresponds to movement of a non-driver passenger, the data may, in some examples, be deleted and/or otherwise appropriately identified as non-driver passenger data for further analysis. Additionally or alternatively, if the movement data evaluation and identification computing platform 110 determines that the movement data corresponds to movement of a non-driver passenger, data may be processed to generate alternate outputs. For instance, the data may be processed with user preferences, user profile data, user subscription data, or the like to generate one or more outputs, such as a promotion, coupon, discount, or the like, from a partner entity (e.g., coffee shop, drug store, grocery store, or the like).

Additional data may then be collected and further analyzed.

Internal data computing system 120 may have, store and/or include data associated with or obtained by an entity implementing the movement data evaluation and identification computing platform 110 and/or stored by the entity. In some examples, internal data computing system 120 may include data associated with customers, one or more insurance claims, accident histories and associated damages or costs, risk ratings associated with a road or road segment, pricing data, user information, and the like. In some examples, internal data computing system 120 may include multiple computing devices storing various different types of data. In other examples, internal data computing system 120 may store the various types of data. In still other examples, internal data computing system 120 may query databases in one or more other computing devices, systems, or the like, to obtain data that may be used in one or more processes described herein. In some examples, data retrieved from internal data computing system 120 may be used (e.g., in combination with externally obtained data) to generate one or more offers, insights, outputs, or the like.

External data computing system 140 and external data computing system 145 may have, store and/or include data from outside of or external to the entity. For instance, external data computing system 140 and/or external data computing system 145 may store publicly available information such as public transportation routes, timing, and the like, information related to various vehicle models and configurations, data associated with applications that execute on various devices such as type of application, and the like. In some examples, one or more of external data computing system 140 and external data computing system 145 may store location data captured by, for instance, a mobile device of a user (such as remote user computing device 170, remote user computing device 175, or the like) and stored by a third party with the appropriate permissions of the user. In some examples, location data stored may include global positioning system coordinates, time stamps, and the like.

Local user computing device 150 and local user computing device 155 may be computing devices associated with an entity implementing or operating the movement data evaluation and identification computing platform 110. For instance, local user computing device 150, 155 may be computing devices used to develop and/or modify one or more applications associated with providing user interfaces and/or generated outputs to a user, controlling features, aspects or parameters of movement data evaluation and identification computing platform 110, and the like.

Remote user computing device 170 and remote user computing device 175 may be computing devices not associated with the entity implementing or operating the movement data evaluation and identification computing platform 110 (e.g., owned by a customer, service provider, vendor, or the like, rather than the entity). Remote user computing device 170, 175 may be computing devices associated with a user and including image capture devices, sensors (e.g., movement sensors such as accelerometers, and the like), global positioning systems, and the like. Remote user computing device 170, 175 may also receive commands or instructions to display one or more user interfaces including one or more generated offers and may display the generated offers. Remote user computing device 170, 175 may further include a plurality of applications stored and/or executing thereon. In some examples, the remote user computing device 170, 175 may include a usage monitor to monitor applications executing on the device 170, 175, type of application, time and date of execution, software and algorithm updates, and the like.

Local user computing device 150, 155, internal data computing system 120, external data computing system 140, external data computing system 145, remote user computing device 170, and remote user computing device 175 may be configured to communicate with and/or connect to one or more computing devices or systems shown in FIG. 1A. For instance, local user computing device 150, 155 and/or internal data computing system 120 may communicate with one or more computing systems or devices via network 190, while remote user computing device 170, remote user computing device 175, external data computing system 140, and/or external data computing system 145 may communicate with one or more computing systems or devices via network 195.

In one or more arrangements, internal data computing system 120, local user computing device 150, local user computing device 155, external data computing system 140, external data computing system 145, remote user mobile computing device 170, and/or remote user computing device 175 may be or include a computing device or combination of devices configured to perform the particular functions described herein. For example, internal data computing system 120, local user computing device 150, local user computing device 155, external data computing system 140, external data computing system 145, remote user mobile computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of movement data evaluation and identification computing platform 110, internal data computing system 120, local user computing device 150, local user computing device 155, external data computing system 140, external data computing system 145, remote user computing device 170, and/or remote user computing device 175 may, in some instances, be or include special-purpose computing devices configured to perform specific functions.

Computing environment 100 also may include one or more computing platforms. For example, and as noted above, computing environment 100 may include movement data evaluation and identification computing platform 110. As illustrated in greater detail below, movement data evaluation and identification computing platform 110 may include one or more computing devices configured to perform one or more of the functions described herein. For example, movement data evaluation and identification computing platform 110 may have or include one or more computers (e.g., laptop computers, desktop computers, tablet computers, servers, server blades, or the like).

As mentioned above, computing environment 100 also may include one or more networks, which may interconnect one or more of movement data evaluation and identification computing platform 110, internal data computing system 120, local user computing device 150, local user computing device 155, external data computing system 140, external data computing system 145, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, movement data evaluation and identification computing platform 110, internal data computing system 120, local user computing device 150, and/or local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect movement data evaluation and identification computing platform 110, internal data computing system 120, local user computing device 150, and/or local user computing device 155, and one or more other computing devices and/or computer systems that are used by, operated by, and/or otherwise associated with the organization. Public network 195 may connect private network 190 and/or one or more computing devices connected thereto (e.g., movement data evaluation and identification computing platform 110, internal data computing system 120, local user computing device 150, local user computing device 155) with one or more networks and/or computing devices that are not associated with the organization. For example, external data computing system 140, external data computing system 145, remote user computing device 170, and/or remote user computing device 175 might not be associated with an organization that operates private network 190 (e.g., because external data computing system 140, external data computing system 145, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect external data computing system 140, external data computing system 145, remote user computing device 170 and remote user computing device 175 to private network 190 and/or one or more computing devices connected thereto (e.g., movement data evaluation and identification computing platform 110, internal data computing system 120, local user computing device 150, and/or local user computing device 155).

Referring to FIG. 1B, movement data evaluation and identification computing platform 110 may include one or more processors 111, memory 112, and communication interface 113. A data bus may interconnect processor(s) 111, memory 112, and communication interface 113. Communication interface 113 may be a network interface configured to support communication between movement data evaluation and identification computing platform 110 and one or more networks (e.g., private network 190, public network 195, or the like). Memory 112 may include one or more program modules having instructions that when executed by processor(s) 111 cause movement data evaluation and identification computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of movement data evaluation and identification computing platform 110 and/or by different computing devices that may form and/or otherwise make up movement data evaluation and identification computing platform 110.

For example, memory 112 of movement data evaluation and identification computing platform 110 may have, store, and/or include a user registration module 112a. The user registration module 112a may store instructions and/or data that may cause or enable the movement data evaluation and identification computing platform 110 to receive information registering a user for a system to evaluate movement data in order to generate one or more outputs. In some examples, the information may include appropriate permissions from the user to capture, transmit, analyze, etc. movement and/or other or additional data (e.g., application usage data, image data, and the like). In some examples, the registration information may be provided with a request to generate an offer or output (e.g., an insurance rate, premium, or the like). In some examples, providing registration information may cause an application to be transmitted from the movement data evaluation and identification computing platform 110 to the remote user computing device 170, 175 from which the registration information was received. The application may execute on the remote user computing device 170, 175 and may capture and/or record movement data, capture and/or store application usage data, capture and/or store image data, and the like.

Memory 112 may further have, store and/or include external data identification module 112b. External data identification module 112b may store instructions and/or data that may cause or enable the movement data evaluation and identification computing platform 110 to identify data stored by one or more external data computing systems, such as systems 140 and/or 145, and transmit instructions or commands to extract identified data. For instance, external data identification module 112b may identify public transportation routes and/or schedules based on a determined or identified geographic location of a user (e.g., GPS data from the user's remote user computing device 170). The identified external information may be extracted and received by the movement data evaluation and identification computing platform 110 for further processing and to evaluate movement data to determine a type of movement data.

Memory 112 may further have, store and/or include movement data analysis module 112c. Movement data analysis module 112c may store instructions and/or data that may cause or enable the movement data evaluation and identification computing platform 110 to receive movement data (e.g., location data, accelerometer data, gyroscope data, and the like) from one or more user devices, such as remote user computing device 170, remote user computing device 175, or the like, and evaluate the data to determine whether it corresponds to data captured while a user was a driver of a vehicle or data captured while a user was a non-driver passenger of a vehicle. As will be discussed more fully herein, the evaluation may be based on comparison to public transportation data, analysis of captured image data, evaluation of applications executing on the device 170, 175, or the like.

Memory 112 may further have, store and/or include user interface generation module 112d. User interface generation module 112d may store instructions and/or data that may cause or enable the movement data evaluation and identification computing platform 110 to generate and cause to display one or more user interfaces. In some examples, the user interfaces may be associated with an application provided by the movement data evaluation and identification computing platform 110 and executing on a remote user computing device 170, 175. In some arrangements, the user interfaces may include an indication of whether movement data is identified as associated with driver or non-driver, passenger movement. Additionally or alternatively, one or more user interfaces may include display of a generated offer, request for acceptance of an offer, or the like.

Movement data evaluation and identification computing platform 110 may further have, store, and/or include data deletion module 112e. Data deletion module 112e may store instructions and/or data that may cause or enable the movement data evaluation and identification computing platform 110 to delete data identified as non-driver passenger data. For instance, after a determination is made as to whether movement data corresponds to movement of a user device when the user is a driver or movement of the computing device when the user is a non-driver passenger, any further movement data may be further processed to evaluate driving behaviors, vehicle operation parameters, and the like, in order to generate one or more outputs. In some examples, data identified as non-driver passenger might not be used in further processing. Accordingly, data deletion module 112e may generate a command or instruction to delete data identified as non-driver passenger. In some examples, the data may be deleted from any databases associated with the entity, such as databases associated with the movement data evaluation and identification computing platform 110, databases associated with internal data computing system 120, and the like. However, data that is resident on the user device (e.g., remote user computing device 170, 175) might not be deleted in at least some examples. For instance, if the movement data evaluation and identification computing platform 110 determines that the movement data corresponds to movement of a non-driver passenger, data may be processed to generate alternate outputs. For instance, the data may be processed with user preferences, user profile data, user subscription data, or the like to generate one or more outputs, such as a promotion, coupon, discount, or the like, from a partner entity (e.g., coffee shop, drug store, grocery store, or the like).

Movement data evaluation and identification computing platform 110 may further have, store and/or include application usage evaluation module 112f. Application usage evaluation module 112f may store instructions and/or data that may cause or enable the movement data evaluation and identification computing platform 110 to receive, from the user device, such as remote user computing device 170, remote user computing device 175, or the like, data associated with applications executing on the device 170, 175. In some examples, the data received may include a type or category of application, time application was executed, stop time of application, duration of execution, and the like. In some examples, the data may be captured via a usage monitor on the remote user computing device 170, 175 which may, in some arrangements, be controlled via an application executing on the mobile device. The received application usage data may be analyzed to identify one or more applications, types of application, categories of applications, or the like, executing on a remote user computing device 170, or remote user computing device 175, at a time when the movement data was captured. In some examples, particular applications, types of applications, categories of applications, or the like, may be more likely to be used with the user is a driver than a passenger, and vice versa. For example, a ride sharing type application is more likely to be executing on an application when a user is a passenger (e.g., to follow route, track progress, provide feedback, and the like) than a driver. Various other examples will be discussed herein.

Movement data evaluation and identification computing platform 110 may further have, store and/or include a machine learning engine 112g and machine learning datasets 112h. Machine learning engine 112g and machine learning datasets 112h may store instructions and/or data that cause or enable movement data evaluation and identification computing platform 110 to evaluate data, such as data received from remote user computing device 170, remote user computing device 175, or the like, data from internal data computing system 120, data from one or more of external data computing system 140 and external data computing system 145, and the like, to determine whether captured movement data (e.g., movement data captured by remote user computing device 170, remote user computing device 175, or the like) corresponds to movement data of a user when driving a vehicle or when a non-driver passenger in the vehicle. The machine learning datasets 112h may be generated based on analyzed data (e.g., data previously received from a device, historical data, and the like), raw data, and/or received from one or more outside sources.

The machine learning engine 112g may receive data and, using one or more machine learning algorithms, may generate one or more machine learning datasets 112h. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112g may analyze data to identify patterns of activity, sequences of activity, and the like, to generate one or more machine learning datasets 112h.

In some arrangements, the machine learning datasets 112h may include machine learning data linking one or more movement data characteristics to a determination or likelihood that a user is a driver or is a non-driver passenger. Additionally or alternatively, the machine learning datasets 112h may include machine learning data linking movement data and/or behaviors or characteristics therein to outputs such as determined risk, insurance rates or premiums, and the like.

The machine learning datasets 112h may be updated and/or validated based on later-received data. For instance, as additional movement data is collected from subsequent time periods, that data may be analyzed and used to validate and/or update the machine learning datasets 112h. Accordingly, the system may continuously refine determinations, outputs, and the like.

Movement data evaluation and identification computing platform 110 may further have, store and/or include an output generation module 112i. Output generation module 112i may store instructions and/or data that may cause or enable the movement data evaluation and identification computing device to receive data and/or determinations, such as machine-learning based determinations, to generate one or more outputs. For instance, the output generation module 112i may receive data and/or determinations regarding whether the movement data corresponds to movement data of a device associated with a user who is a driver of a vehicle or a non-driver passenger of a vehicle and, if the data is associated with movement data of a device associated with a user who is a driver of the vehicle, may generate one or more outputs, such as a risk associated with the user, insurance premiums, insurance rates, discounts, offers, and the like.

Figure 2:
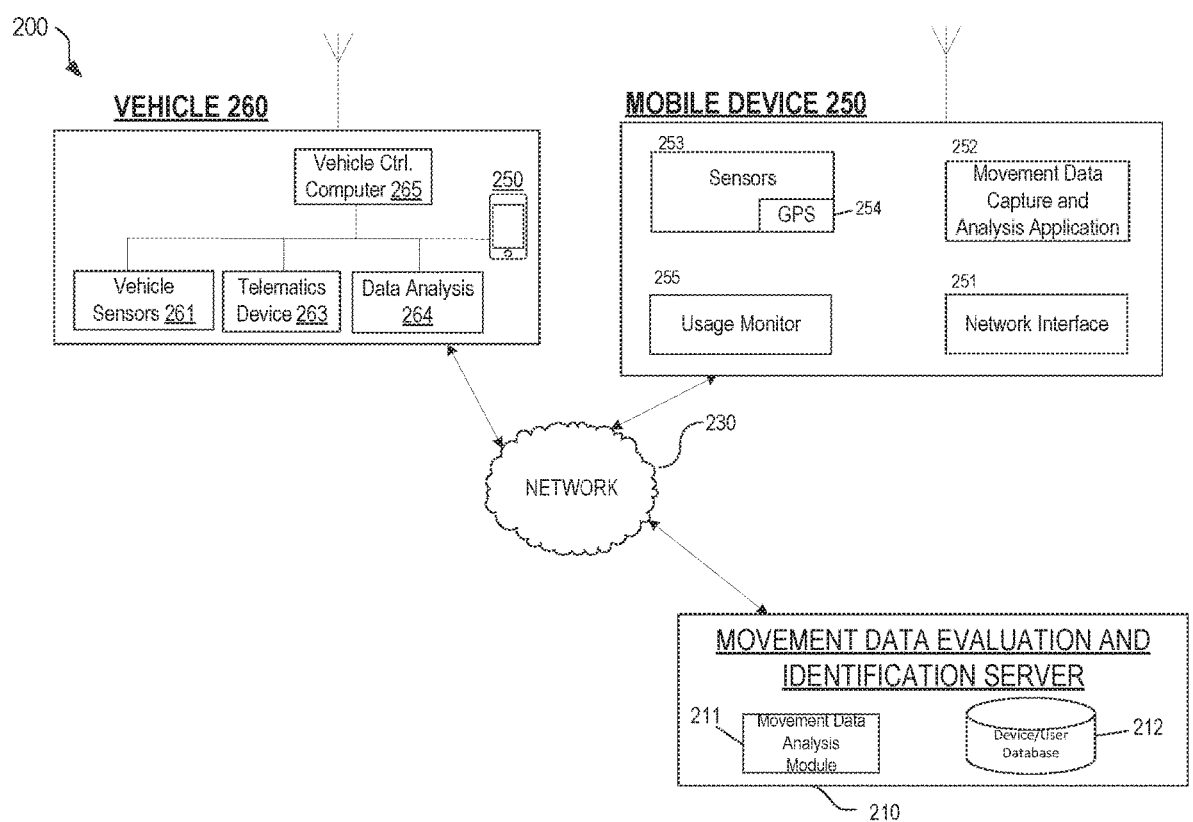
FIG. 2 is a diagram illustrating various components and devices of a movement data evaluation and identification system according to one or more aspects described herein.

FIG. 2 is a diagram of an illustrative movement data evaluation and identification system 200 including a vehicle 260, a mobile device 250, a movement data evaluation and identification server 210, and additional related components. Each component shown in FIG. 2 can be implemented in hardware, software, or a combination of the two. Additionally, each component of the movement data evaluation and identification system 200 can include a computing device (or system) having some or all of the structural components described herein. The movement data evaluation and identification system 200 can also include or be in communication with one or more servers, devices, and the like, shown and described with respect to FIG. 1.

One or more components shown in FIG. 2, such as the vehicle 260 and the mobile device 250, can communicate with each other via wireless networks or wired connections (e.g., for devices physically docked in vehicles), and each can communicate with one or more additional vehicles, additional mobile computing devices, and/or a number of external computer servers 210, over one or more communication networks 230. In some examples, the mobile device 250 can be paired (e.g., via Bluetooth technology) to one or more other devices (e.g., another mobile device, such as a wearable device, tablet, etc.). If the device is no longer in proximity to be paired, a notification can be generated and displayed on the device.

As discussed herein, the components of movement data evaluation and identification system 200, operating individually or using communication and collaborative interaction, can perform such features and functions such as receiving movement data from a mobile device, such as remote user computing device 170, 175, receiving additional mobile device data, receiving internal data, receiving external data, evaluating movement data to determine whether it corresponds to movement of a device associated with a user who is a driver of a vehicle or a non-driver passenger of a vehicle, generating outputs, and the like.

Movement data evaluation and identification system 200 can include one or more mobile devices 250. Mobile device 250 can be, for example, smartphones or other mobile phones, personal digital assistants (PDAs), tablet computers, laptop computers, wearable devices such as smart watches and fitness monitors, and the like. Mobile device 250 can include some or all of the elements described herein with respect to computing devices. In some examples, mobile device 250 may correspond to remote user computing device 170, remote user computing device 175, or the like.

The mobile device 250 can include a network interface 251, which can include various network interface hardware (e.g., adapters, modems, wireless transceivers, etc.) and software components to allow mobile device 250 to communicate with movement data evaluation and identification server 210, vehicle 260, and various other external computing devices. One or more specialized software applications, such as movement data capture and analysis applications 252 can be stored in the memory of the mobile device 250. The movement data capture and analysis application(s) 252 can be received via network interface 251 from the movement data evaluation and identification server 210, vehicle 260, movement data evaluation and identification computing platform 110, or other application providers (e.g., public or private application stores). Certain movement data capture and analysis applications 252 might not include user interface screens while other applications 252 can include user interface screens that support user interaction. Such applications 252 and can be configured to run as user-initiated applications or as background applications. The memory of mobile device 250 also can include databases configured to receive and store sensor data received from mobile device sensors, usage type, application usage data, and the like. Although aspects of the movement data capture and analysis software application(s) 252 are described as executing on mobile device 250, in various other implementations, some or all of the movement data capture and analysis functionality described herein can be implemented by movement data evaluation and identification server 210, movement data evaluation and identification computing platform 110, or the like.

As discussed herein, mobile device 250 can include various components configured to generate and/or receive data associated with usage of the mobile device 250, movement of the mobile device 250, location of the mobile device 250, and the like. For example, using data from sensors 253 (e.g., 1-axis, 2-axis, or 3-axis accelerometers, compasses, speedometers, vibration sensors, gyroscopic sensors, etc.) and/or GPS receivers or other location-based services (LBS) 254, an application 252 (or other device or module, e.g., movement data evaluation and identification server 210) can determine movement of the mobile device 250 (e.g., in a vehicle such as a car, train, bus, airplane, boat, recreational vehicle, motorcycle, or the like, with a user who is walking, with a user who is running, etc.). The sensors 253 and/or GPS receiver or LBS component 254 of a mobile device 250 can also be used to determine driving speeds, routes, stoppage points, accident force and angle of impact, and other accident characteristics and accident-related data. In some examples, this data may be transmitted to and/or stored by a third party computer system, such as external data computing system 140 with the permission of the user. Location data, such as GPS coordinates and associated time and date stamps may also be captured and, in some examples, may be stored by an external data computing system, such as a third party system (e.g., external data computing system 140) with permission of the user. In some examples, the captured data may be stored locally by the mobile device 250, and the like.

In some examples, sensors 253 may include an image capture device. The mobile device 250 may include one or more image capture devices (e.g., front facing camera, rear facing camera, and the like). In some examples, an application executing on the mobile device 250, such as movement data capture and analysis application 252 may execute a command or instruction to capture an image using one or more image capture devices. The captured image may be taken after a notification is displayed to a user of the mobile device 250 and may capture a position of the user within the vehicle. This image may then be analyzed to detect items such as position of window relative to the user, angle or position of seat belt on a user, and the like, which may be used to determine whether the user is a driver of the vehicle or is a non-driver passenger. For instance, in vehicles with the driver seat on a left of the vehicle (e.g., when facing forward), the window may be on the left of the user, seat belt over the left shoulder, or the like, which may indicate that the user is in a driver seat of a left side driver car. In another example, also in a left side driver car, the image may be analyzed to determine that the user is a non-driver passenger by identifying, for example, the window on right side of user, seat belt over right shoulder, or the like). In vehicles having a right side driver, the image may be analyzed to determine that the user is a driver (e.g., window on right side of user, seat belt over right shoulder, etc.) or a non-driver passenger (e.g., window on left side of user, seat belt over left shoulder, or the like). In some examples, the image may be captured automatically. In other examples, a user may be prompted to capture an image. Further, a mobile device 250 may be fixed to a portion of the vehicle (e.g., in a carrier, case or other device connected to the vehicle) and the image may be captured from that fixed position.

Mobile device 250 can further include a usage monitor 255. The usage monitor can be a device (e.g., including a processor, etc.) and can include hardware and/or software configured to monitor various aspects of the usage of the mobile device 250. For instance, the usage monitor 255 can monitor a number of minutes, hours, or the like the device is in use (e.g., based on factors such as device being illuminated, user interacting with or looking at the device, etc.). As described herein, mobile device 250 can execute a variety of applications. Many of these applications include a variety of driving, navigation, vehicle monitoring, and/or other travel-specific applications. Usage of these applications can indicate that the user is traveling in a vehicle while the application is being used and/or whether the user is a driver or non-driver passenger. The usage monitor 255 can monitor which applications are used at a time period corresponding to captured movement data. In still other examples, the usage monitor 255 can determine a type of motion or speed of motion associated with movement of the mobile device 250, whether the device is maintained within a case, and the like. Additional aspects of device usage can be monitored without departing from the invention. In some examples, data from usage monitor 255 can be accessed by the movement data capture and analysis application 252 for analysis and/or transmission to, for instance, movement data evaluation and identification server 210. Data from usage monitor 255 can be transmitted directly to the movement data evaluation and identification server 210.

In some examples, usage monitor 255 may also detect applications of a certain type or category executing at a predefined time or time period. For instance, in some examples, each application may be assigned a type and/or category. This assigned type and/or category may be stored in a database. As the usage monitor 255 collects data related to usage of the device 250, a time period in which particular applications, applications of a certain type, applications of a certain category, or the like, are executing may be captured and/or stored. This information may be identified (e.g., based on time stamps associated with execution of application(s)) for a time corresponding to a time of the movement data to determine whether the user was a driver or a non-driver passenger.

The mobile device 250 can be configured to establish communication with movement data evaluation and identification server 210 or other computing system (such as external data computing system 140) via one or more wireless networks (e.g., network 230). The mobile device 250, when carried in a vehicle 260, can be used to detect performance and/or operational characteristics of the vehicle 260, similar to the one or more sensors arranged in the vehicle 260. Mobile device 250 can be configured to be paired (e.g., via Bluetooth technology) to one or more other devices, such as vehicle 260 or the like. In a variety of embodiments, the mobile device 250 includes any of the sensors described below and/or is capable of obtaining any of the data described with respect to vehicle 260 without a connection to the vehicle 260 or any device within the vehicle 260. In some examples, a number of devices available to be paired with the mobile device 250 may be identified and compared to a threshold. If the number is over the threshold, it is likely that the driver is on public transportation and, thus, is a non-driver passenger.

Movement data evaluation and identification system 200 can further include a vehicle 260.

Vehicle 260 can be, for example, automobiles, motorcycles, scooters, buses, recreational vehicles, boats, or any other vehicles for which driving behaviors can be analyzed. Vehicle 210 can include vehicle operation sensors 261 capable of detecting and recording various conditions at the vehicle and operational parameters of the vehicle. For example, sensors 261 can detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 261 also can detect and store data received from the vehicle's 260 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board computing device (OBD).

Additional sensors 261 can detect and store the external driving conditions, for example, external temperature, rain, snow, light levels, and sun position for driver visibility. For example, external cameras and proximity sensors 261 can detect other nearby vehicles, vehicle spacing, traffic levels, road conditions, traffic obstructions, animals, cyclists, pedestrians, and other conditions that can relate to vehicle accidents and accident characteristics. Sensors 261 also can detect and store data relating to moving violations and the observance of traffic signals and signs by the vehicle 260. Additional sensors 261 can detect and store data relating to the maintenance of the vehicle 260, such as the engine status, oil level, engine coolant temperature, odometer reading, the level of fuel in the fuel tank, engine revolutions per minute (RPMs), software upgrades, and/or tire pressure.

Vehicles sensors 261 also can include cameras and/or proximity sensors capable of recording conditions inside or outside of the vehicle 260. For example, internal cameras can detect conditions such as the identity of the driver (e.g., using facial recognition software), the number of the occupants, the types of occupants (e.g. adults, children, teenagers, pets, etc.), and the seating/positioning of the occupants in the vehicles. Internal cameras also can detect potential sources of driver distraction within the vehicle, such as pets, phone usage, and unsecured objects in the vehicle. Sensors 261 also can be configured to collect data identifying a current driver from among a number of different possible drivers, for example, based on driver's seat and mirror positioning, driving times and routes, radio usage, etc. Sensors 261 also can be configured to collect data relating to a driver's movements or the condition of a driver. For example, vehicle 260 can include sensors that monitor a driver's movements, such as the driver's eye position and/or head position, etc. Additional sensors 261 can collect data regarding the physical or mental state of the driver, such as fatigue or intoxication. The condition of the driver can be determined through the movements of the driver or through other sensors, for example, sensors that detect the content of alcohol in the air or blood alcohol content of the driver, such as a breathalyzer.

Certain vehicle sensors 261 also can collect information regarding the vehicle's location, current and past driving routes, in order to classify the type of trip (e.g. work or school commute, shopping or recreational trip, unknown new route, etc.). In certain embodiments, sensors and/or cameras 261 can determine when and how often the vehicle 260 stays in a single lane or stray into other lanes. A Global Positioning System (GPS), locational sensors positioned inside the vehicle 260, and/or locational sensors or devices external to the vehicle 260 can be used to determine the route, lane position, road-type (e.g. highway, entrance/exit ramp, residential area, etc.) and other vehicle position/location data which can be used to analyze accidents and accident characteristics, generate driver safety ratings, generate one or more user or driver insights, generate one or more outputs, and the like.

The data collected by vehicle sensors 261 can be stored and analyzed within the respective vehicle 260, for example, in vehicle data analysis device 264, which can be integrated into or installed at the vehicle 210. In other cases, the data collected by vehicle sensors 261 can be transmitted to one or more external devices for analysis, such as a mobile device 250 or external servers 210, computing platform 110, or the like. In some examples, the data may be transmitted to and stored by a third party computing system (such as external data computing system 140) and transmitted to other devices for analysis. The sensor data can be transmitted from vehicles 260 via a telematics device 263 or other network interface(s) to one or more remote computing devices, such as one or more mobile devices 250, movement data evaluation and identification server 210, and/or other external servers or systems (e.g., external data computing system 140).

Vehicle 260 can use telematics devices 263 to transmit data to and receive data from servers 210 and mobile devices 250. Telematics devices 263 can be computing devices containing many or all of the hardware/software components as a computing device described herein. In some cases, telematics devices 263 can receive vehicle sensor data, operation data, location data, and/or driving data from vehicle sensors 261, and can transmit the data to one or more external computer systems (e.g., movement data evaluation and identification server 210, other external data computing system, such as external data computing system 140, or the like) over a wireless transmission network 230. The telematics devices 263 also can store the type of their respective vehicle 260, for example, the make, model, trim (or sub-model), year, and/or engine specifications, as well as other information such as vehicle owner or driver information, insurance information, warranty information, and financing information for the vehicle 260.

Telematics devices 263 can receive data from vehicle sensors 261, and can transmit the data to a mobile device 250 or movement data evaluation and identification server 210. However, in other examples, one or more of the vehicle sensors 261 or other vehicle-based systems can be configured to receive and transmit data directly from or to other servers 210 or mobile device 250 without using a telematics device. For instance, telematics devices 263 can be configured to receive and transmit data from certain vehicle sensors 261 or systems, while other sensors or systems can be configured to directly receive and/or transmit data to servers 210 or mobile device 250 without using the telematics device 263. Thus, telematics devices 263 can be optional in certain embodiments.

The system 200 also can include one or more external servers, such as movement data evaluation and identification server 210, which can contain some or all of the hardware/software components as computing devices described herein. Movement data evaluation and identification server 210 can communicate with vehicle 260 and mobile devices 250 via one or more communication networks 230. The movement data evaluation and identification server 210 can include some or all of the components and/or functionality described with respect to FIGS. 1A and 1B. The server 210 can include one or more databases 212 configured to store data associated with a user, device, or the like, that can be used to evaluate risk, identify type of movement data, evaluate usage, and the like. Further, the server 210 can include movement data analysis module 211 which can provide some or all of the operations and/or functionality described with respect to FIGS. 1A and 1B. The movement data evaluation and identification server 210 can include one or more databases 212 configured to store data associated with driving behaviors, performance data, operational data, movement data, device usage data, and the like.

FIGS. 3A-3G illustrate one example event sequence for performing movement data evaluation and identification functions in accordance with one or more aspects described herein. The sequence illustrated in FIGS. 3A-3G is merely one example sequence and various other events may be included, or events shown may be omitted, without departing from the invention.

Figure 3A:
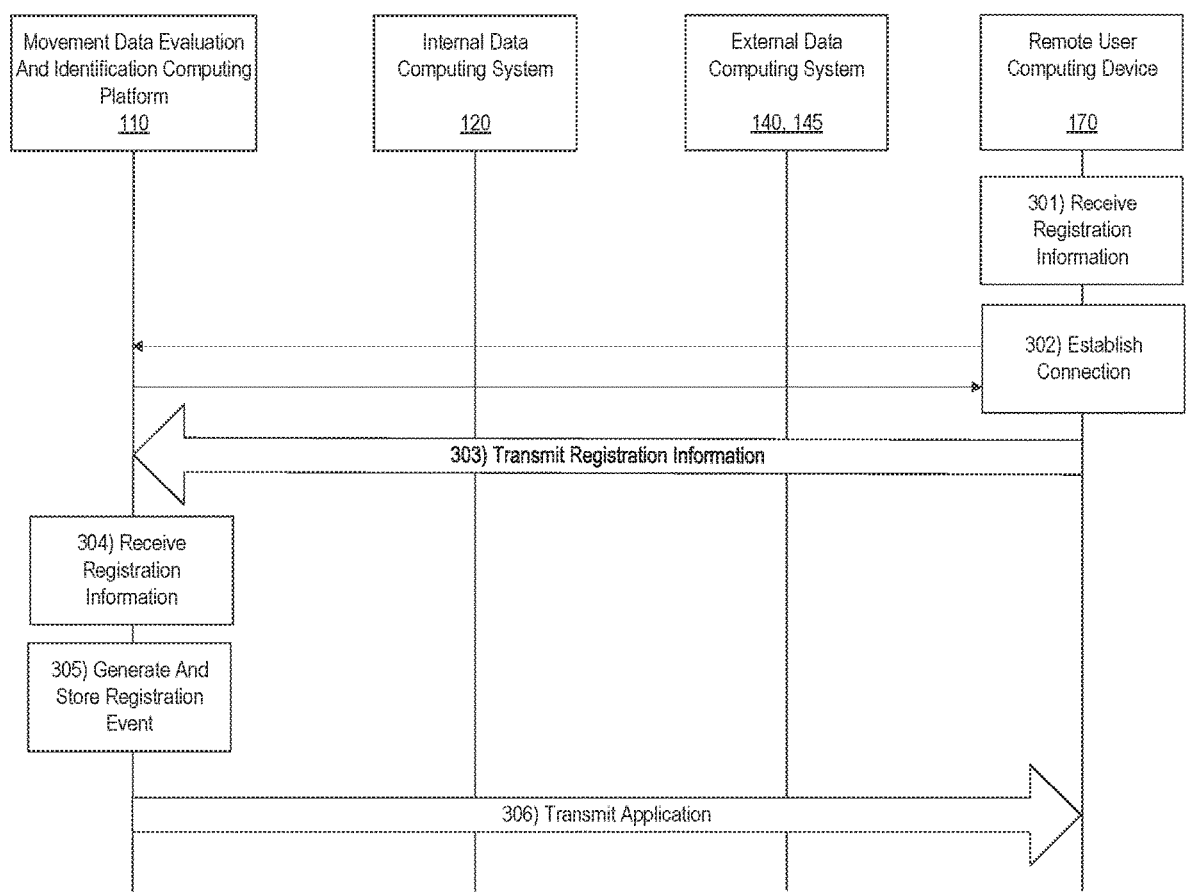
FIGS. 3A-3G depict an illustrative event sequence for performing movement data evaluation and identification functions, according to one or more aspects described herein.

With reference to FIG. 3A, in step 301, a request for registration may be received by, for instance, remote user computing device 170. In some examples, the remote user computing device 170 may be a mobile device of a user. In some arrangements, the request for registration may include registration information, such as identifying information of the user, contact information of the user, information related to a request for, for instance, an insurance quote such as make, model, trim of vehicle, year, and the like, user permissions for the system to capture, store and/or analyzed data, and the like. In some examples, the user may request registration after the user is a customer of the entity implementing the movement data evaluation and identification computing platform 110. For instance, the user may be an existing customer of an insurance provider who is looking to obtain discounts, rebates, a new insurance rate or quote, or the like for an existing policy. In other examples, the user may be a potential customer of the insurance provider. If a potential customer, registration information may include additional information not already obtained by the entity.

At step 302, a connection may be established between the remote user computing device 170 and the movement data evaluation and identification computing platform 110. For instance, a first wireless connection may be established between the remote user computing device 170 and the movement data evaluation and identification computing platform 110. Upon establishing the first wireless connection, a communication session may be initiated between the movement data evaluation and identification computing platform 110 and the remote user computing device 170.

At step 303, the registration information may be transmitted from the remote user computing device 170 to the movement data evaluation and identification computing platform 110. For instance, the registration information may be transmitted during the communication session initiated upon establishing the first wireless connection. At step 304, the registration information may be received by the movement data evaluation and identification computing platform 110.

At step 305, a registration event may be generated and registration information may be stored with the registration event. For instance, a new data element in a database may be generated associated with the registration and may store the user information and other registration information provided by the user.

At step 306, the movement data evaluation and identification computing platform 110 may transmit an application to the remote user computing device 170. In some examples, the application may be transmitted in response to receiving the registration information, generating the registration event, or the like. The application may execute, as shown at step 307 in FIG. 3B, on the remote user computing device 170 and may facilitate capture and transmission of movement data, capture and transmission of application usage data, capture and transmission of image data, and the like.

Figure 3B:
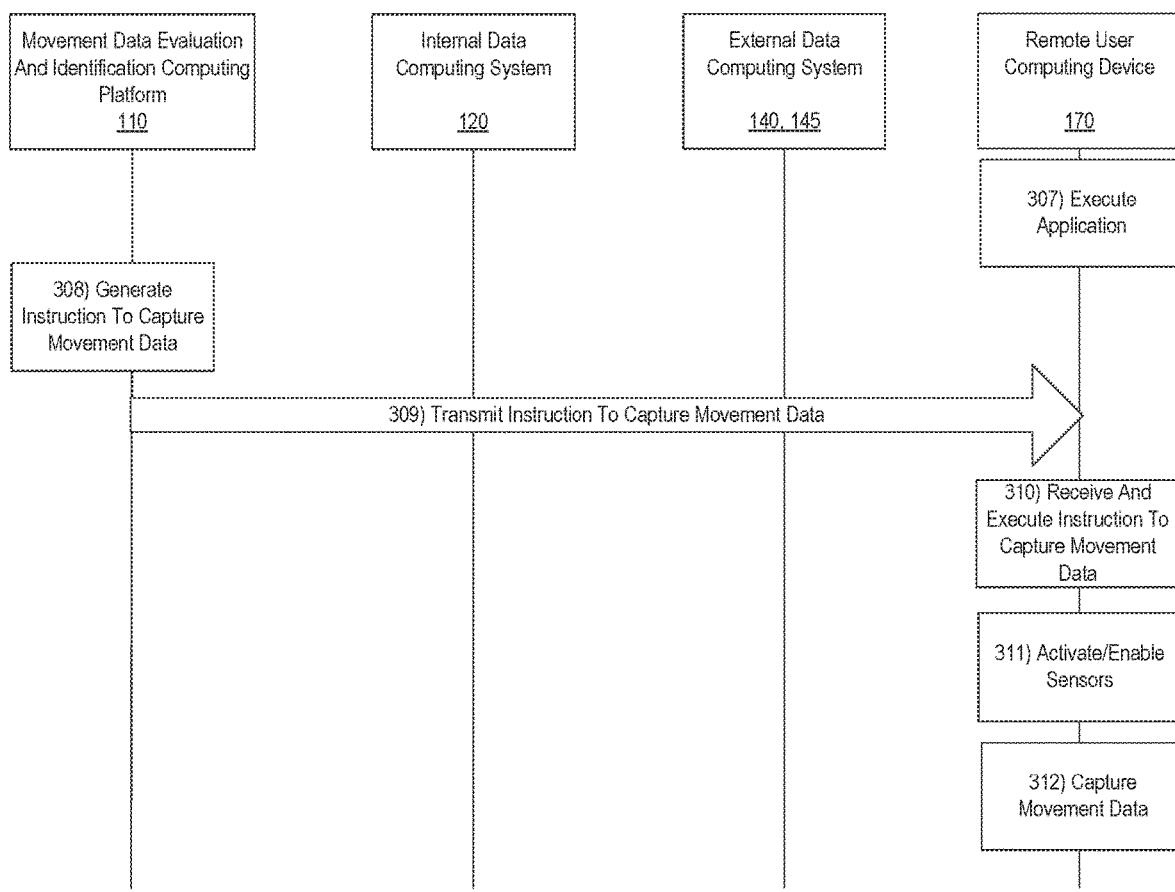

With further reference to FIG. 3B, at step 308, an instruction or command to capture movement data may be generated by the movement data evaluation and identification computing platform 110. In some examples, the instruction may include an instruction or command to activate one or more sensors on the remote user computing device 170 (e.g., accelerometers, GPS, or the like) may be generated. In some examples, the instruction may include an instruction to capture previously captured movement data from a predetermined time period (e.g., previous week, previous day, previous month, or the like). Additionally or alternatively, the instruction may include an instruction to capture movement data going forward (e.g., upcoming day, week, month, or the like).

At step 310, the instruction to capture movement data may be received by the remote user computing device 170 and may be executed. At step 311, in arrangements in which the instruction includes an instruction to activate or enable one or more sensors, the sensors may be activated or enabled. In some examples, particular sensors (e.g., a particular accelerometer, a particular camera, or the like) may be identified for activation or enablement in the generated instruction and the identified sensor(s) may be enabled or activated.

At step 312, movement data may be captured or collected based on the executed instruction. As discussed above, the captured or collected movement data may be movement data captured by one or more sensors (e.g., location or GPS sensors, accelerometers, gyroscopes, and the like) in the remote user computing device 170 and may be from a previously occurring time period or a future time period.

Figure 3C:
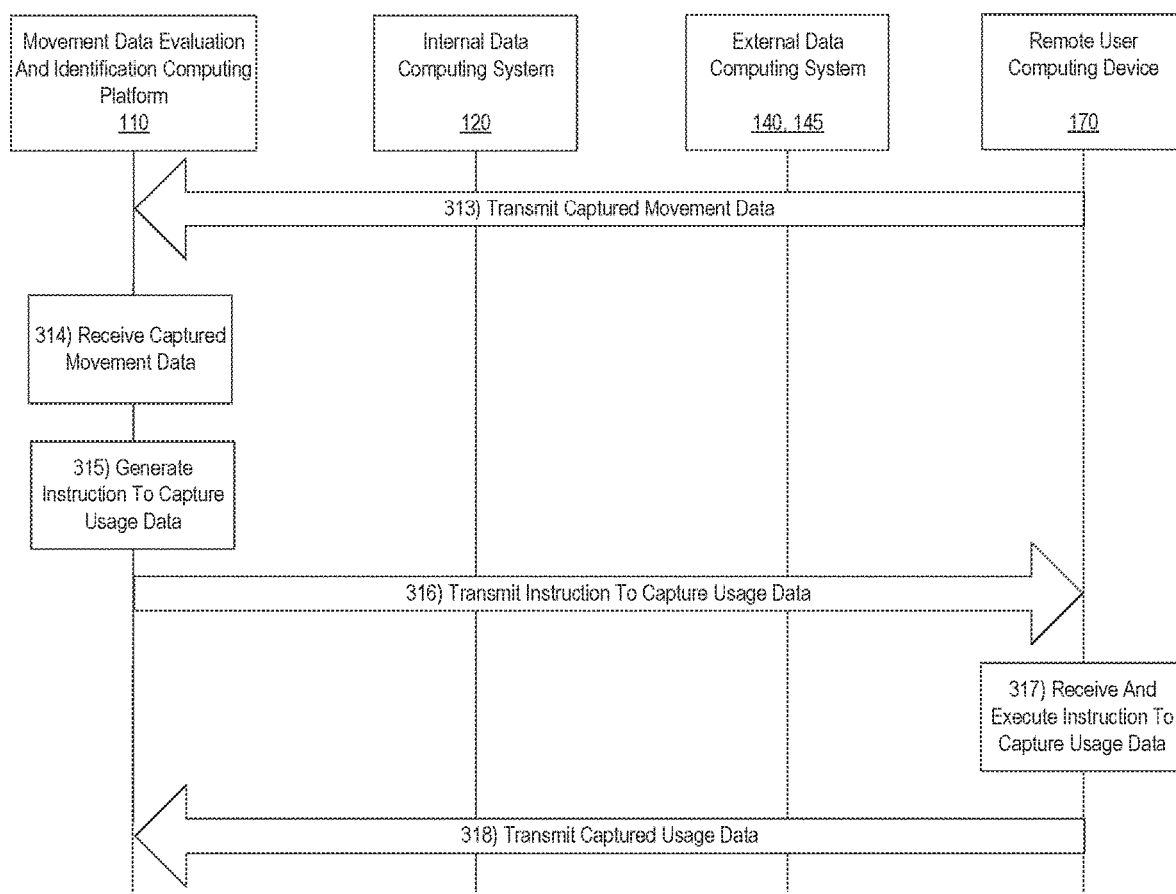

With reference to FIG. 3C, at step 313, the captured movement data may be transmitted from the remote user computing device 170 to the movement data evaluation and identification computing platform 110. At step 314, the captured data may be received by the movement data evaluation and identification computing platform 110. In some examples, receiving the data may cause an initial processing of the movement data to occur. For instance, the movement data may be analyzed to identify one or more time periods associated with the movement data. In some examples, this may be based on time stamps associated with the received movement data. In some examples, the movement data may correspond to a single driving trip (e.g., a starting point, a destination point and travel between). In other examples, the movement data may be over a predefined time period (e.g., one day, one month, one week, or the like) and may include a plurality of driving trips. Processing the movement data may include identifying driving trips within the movement data (e.g., based on starting points, stoppage points, known locations such as a home address, work address, or the like). Additional data used to evaluate the movement data to identify a user as a driver or non-driver passenger may be compared to the overall movement data or to individual driving trips.

At step 315, at step 316, an instruction to captured device usage data may be generated. For instance, an instruction to capture data associated with applications executing on the remote user computing device 170, types of applications executing, categories of applications executing, time of execution, and the like may be generated. In some examples, the instruction may include a time period for which the data should be captured. For instance, the instruction may include a time period corresponding to the time period for which movement data was captured. In some arrangements, this may be based on the initial processing of the movement data to identify a time period associated with the movement data.

At step 316, the generated instruction may be transmitted from the movement data evaluation and identification computing platform 110 to the remote user computing device 170. At step 317, the instruction may be executed by the remote user computing device 170 and the identified usage data may be captured. The usage data may include data associated with usage of all applications executing in the identified time period, requested categories of applications executing in the requested time period, types of applications executing in the requested time period, and the like.

At step 318, the captured usage data may be transmitted from the remote user computing device 170 to the movement data evaluation and identification computing platform 110.

Figure 3D:
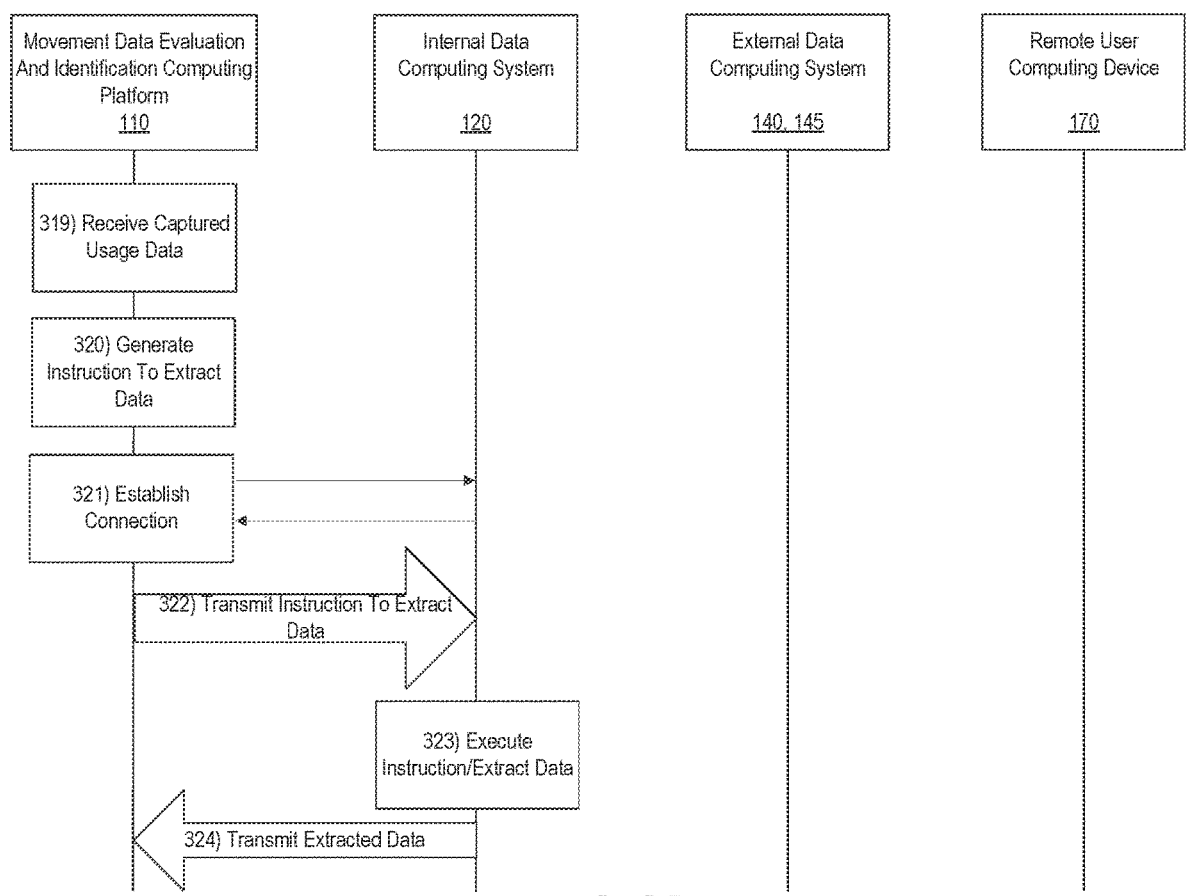

With reference to FIG. 3D, at step 319, the captured usage data may be received by the movement data evaluation and identification computing platform 110.

At step 320, an instruction to extract data from one or more internal data sources may be generated. For instance, an instruction to extract information associated with the user of the device, historical data, previous policy or premium data, and the like, may be generated.

At step 321, a connection may be established between the movement data evaluation and identification computing platform 110 and internal data computing system 120. For instance, a second wireless connection may be established between the movement data evaluation and identification computing platform 110 and the internal data computing system 120. Upon establishing the second wireless connection, a communication session may be initiated between the movement data evaluation and identification computing platform 110 and the internal data computing system 120.

At step 322, the generated instruction to extract data may be transmitted from the movement data evaluation and identification computing platform 110 to the internal data computing system 120. The instruction may be transmitted during the communication session initiated upon establishing the second wireless connection.

At step 323, the instruction to extract data may be received by the internal data computing system 120 and may be executed by the system to extract the identified data. At step 324, the extracted data may be transmitted from the internal data computing system 120 to the movement data evaluation and identification computing platform 110.

Figure 3E:
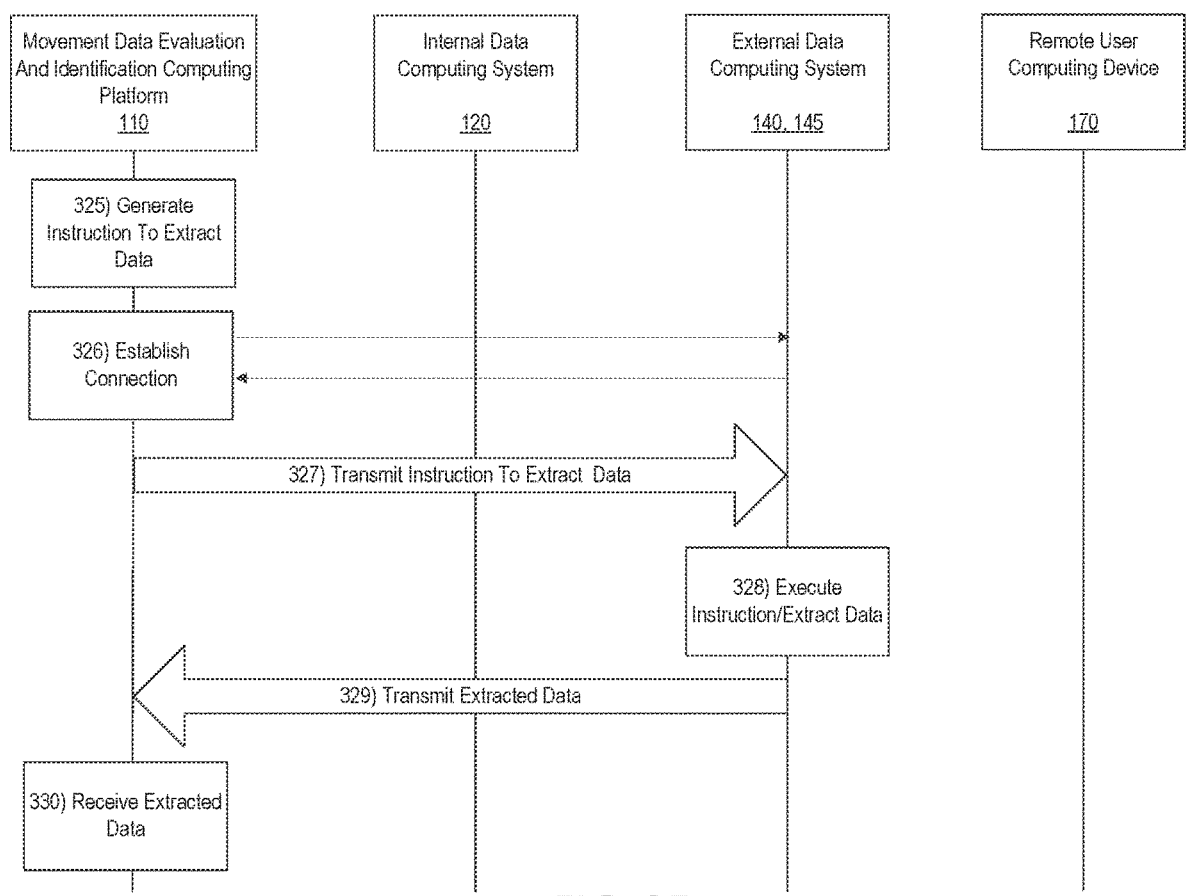

With reference to FIG. 3E, at step 325, an instruction to extract data from one or more external data sources may be generated. For instance, an instruction to extract information associated with the public transportation schedules, public transportation routes, traffic data, weather data, and the like may be generated. In some examples, data may be stored in multiple external data systems, such as external data computing system 140, external data computing system 145, and the like. Accordingly, instructions may be generated for each system when more than one system includes data for use in the evaluation.

At step 326, a connection may be established between the movement data evaluation and identification computing platform 110 and external data computing system 140 and/or external data computing system 145. For instance, a third wireless connection may be established between the movement data evaluation and identification computing platform 110 and the external data computing system 140 and/or external data computing system 145. Upon establishing the third wireless connection, a communication session may be initiated between the movement data evaluation and identification computing platform 110 and the external data computing system 140 and/or external data computing system 145.

At step 327, the generated instruction to extract data may be transmitted from the movement data evaluation and identification computing platform 110 to the external data computing system 140 and/or external data computing system 145. The instruction may be transmitted during the communication session initiated upon establishing the third wireless connection.

At step 328, the instruction to extract data may be received by the external data computing system 140 and/or external data computing system 145 and may be executed by the system to extract the identified data. At step 329, the extracted data may be transmitted from the external data computing system 140 and/or external data computing system 145 to the movement data evaluation and identification computing platform 110.

At step 330, the extracted data may be received by the movement data evaluation and identification computing platform 110 from the internal data computing system 120, external data computing system 140 and/or external data computing system 145.

Figure 3F:
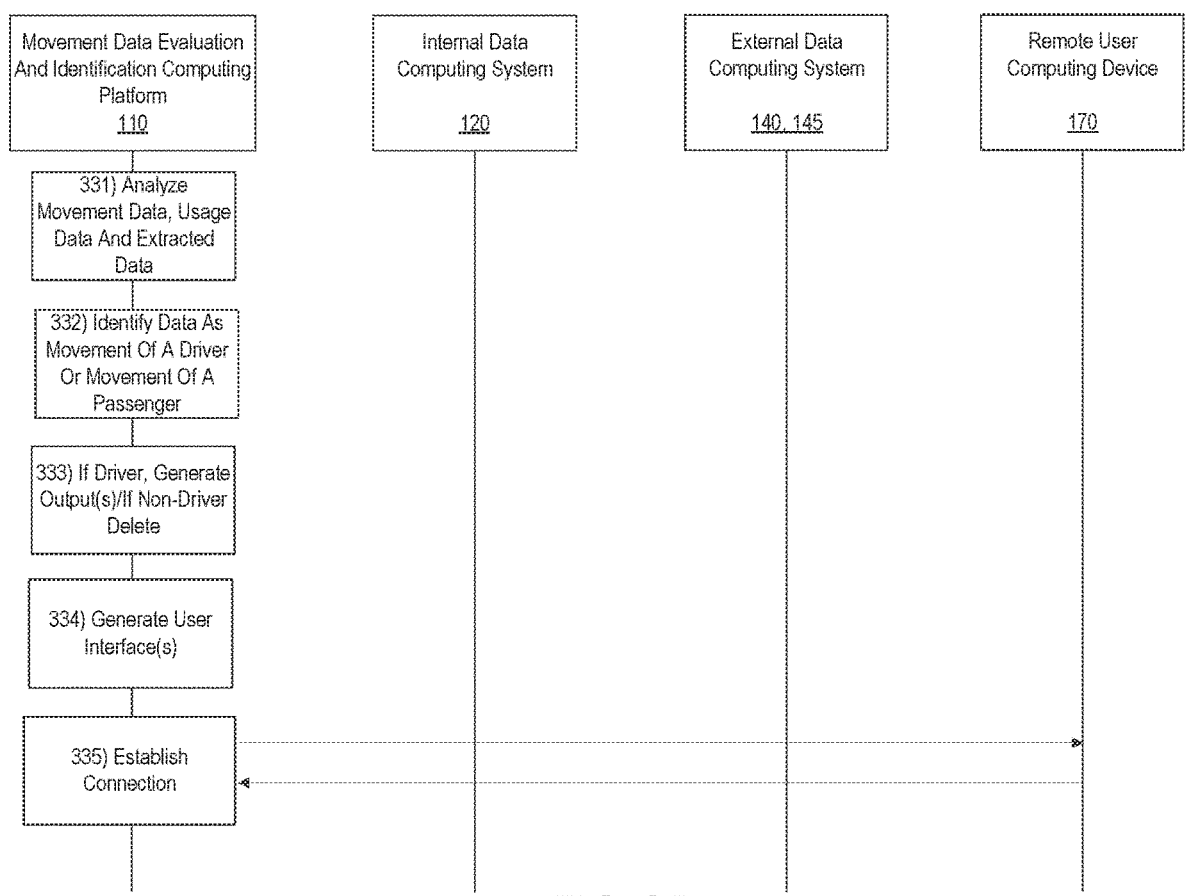

With reference to FIG. 3F, at step 331, the movement data, device usage data and/or extracted data may be analyzed. In some examples, as discussed herein, machine learning may be used to analyze the data and identify one or more patterns, sequences, or the like.

In some examples, analyzing the data may include analyzing the movement data and location data to identify stoppage points in one or more trips, time periods within the data, or the like. The stoppage points may be compared to public transportation route and schedule data to determine whether the stoppage points align with the stoppage points in the movement data. In some arrangements, remote user computing device 170 data associated with devices available for pairing (e.g., via BLUETOOTH) may be received and analyzed. If more than a threshold number of devices are available for pairing, that may indicate that the user is a passenger in public transportation rather than in a car.

In another example, the device usage data may be analyzed to identify particular applications, types of applications and/or categories of applications executing during the time period corresponding to the movement data or portion thereof. For instance, ride sharing applications are often executing when a driver is a passenger on a ride share trip. Accordingly, an application of that type of category executing on the device may indicate that the user is a non-driver passenger.

In still another example, data received from the remote user computing device 170 may include image data of the user. The image data may be analyzed and compared to previously captured images, known points of reference in a particular make or model of vehicle, or the like, to determine whether the user is a driver or non-driver passenger.

Although determinations may be made based on a single type of data (e.g., one of usage data, mobile device data, publicly available data, image data or the like), in some examples, accuracy of the determination may improve when multiple types of data are used in the analysis.

Analyzing the data may include various other aspects without departing from the invention.

At step 332, based on the analysis of the movement data, usage data and/or extracted data, the movement data may be identified as data associated with movement of a device when a user is a driver or movement of a device when a user is a non-driver passenger.

At step 333, if the movement data corresponds to non-driver passenger data, the data may, in some examples, be deleted. If the data corresponds to driver data, the data may be further analyzed to generate one or more outputs. For instance, the movement data may be analyzed to determine occurrences of speeding, hard braking, or the like. In some examples, additional data may be requested form one or more sensors in the remote user computing device 170 or an associated vehicle (such as vehicle 250) to evaluate operation of the vehicle, driving behaviors during the time period, and the like. Some example outputs may include an offer for an insurance rate or premium, an adjustment to an insurance rate or premium, a discount, a rebate or other offer.

At step 334, one or more user interfaces may be generated. The one or more user interfaces may include the generated output, information related to the analysis of the movement data and/or outcome of the movement data analysis, and the like.

At step 335, a connection may be established between the movement data evaluation and identification computing platform 110 and remote user computing device 170. For instance, a fourth wireless connection may be established between the movement data evaluation and identification computing platform 110 and the remote user computing device 170. Upon establishing the fourth wireless connection, a communication session may be initiated between the movement data evaluation and identification computing platform 110 and the remote user computing device 170. In some examples arrangements, the connection established at step 302 may be used and step 335 establishing the fourth wireless connection may be omitted.

Figure 3G:
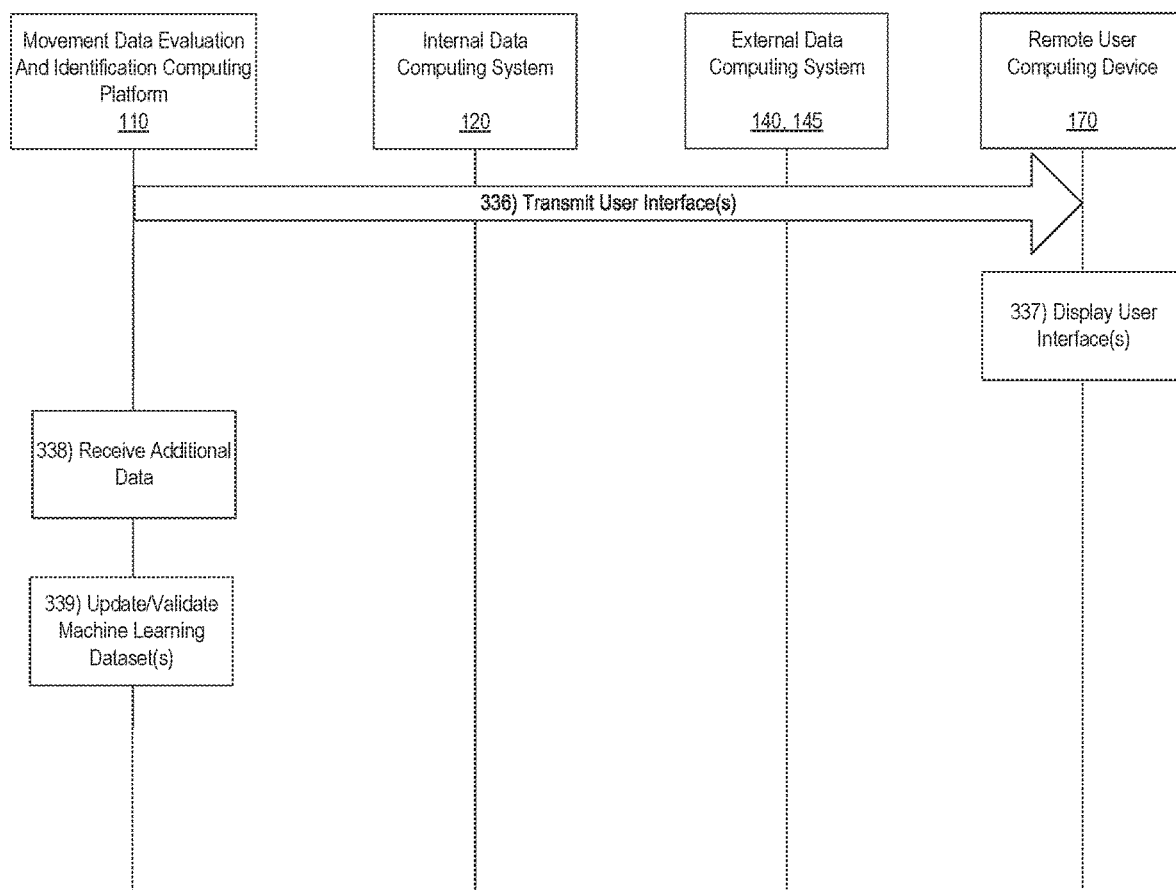

With reference to FIG. 3G, at step 336, the generated user interface(s) may be transmitted from the movement data evaluation and identification computing platform 110 to the remote user computing device 170. The user interface(s) may be displayed on a display of the remote user computing device 170 at step 337.

At step 338, additional data may be received by the movement data evaluation and identification computing platform 110. The additional data may include additional movement data, device usage data, mobile device data, external data, and the like. The additional data may be used to validate and/or update the one or more machine learning datasets at step 339.

Figure 4:
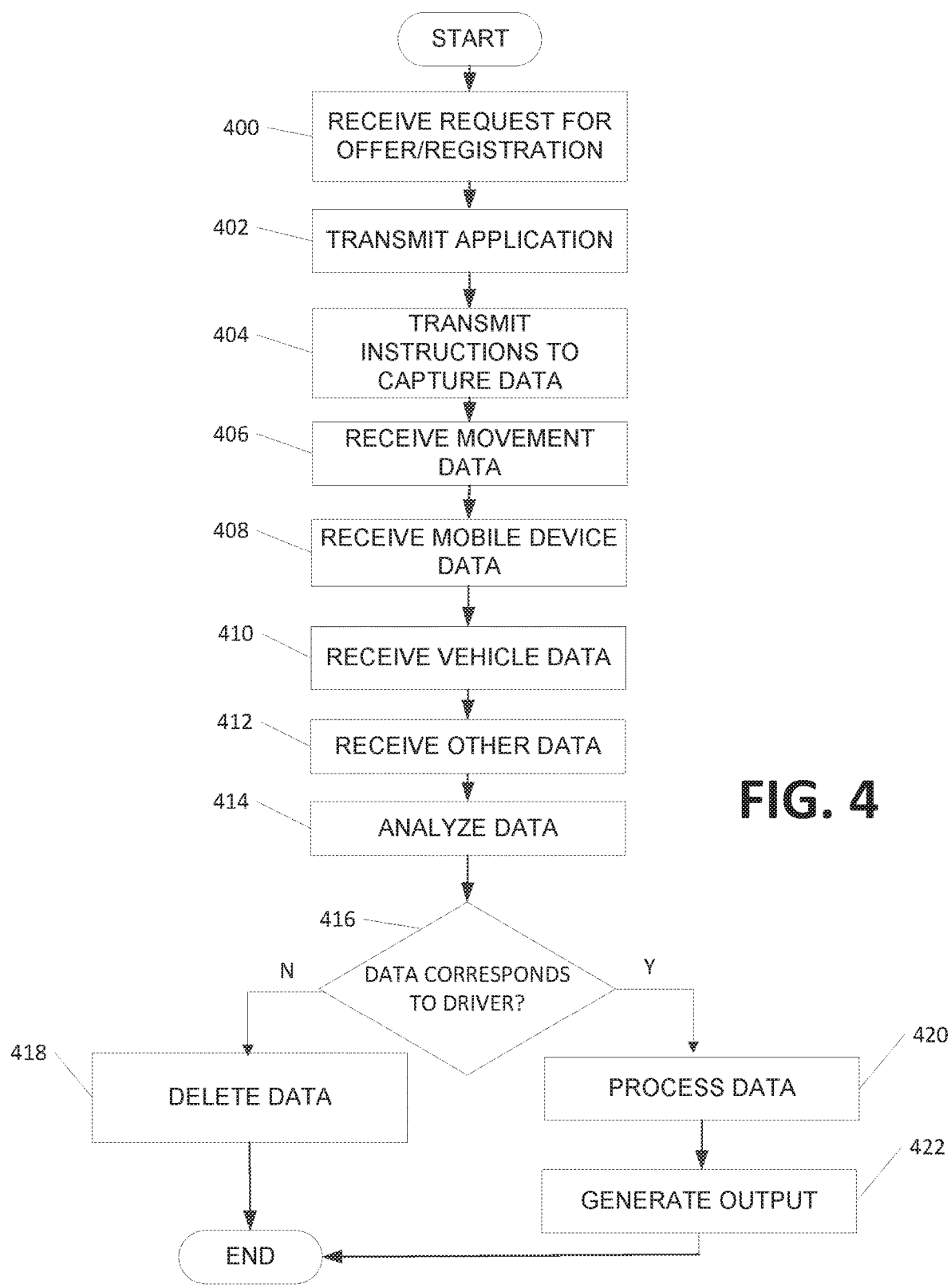
FIG. 4 illustrates one example flow chart illustrating an example method of movement data evaluation and identification functions, according to one or more aspects described herein.

FIG. 4 illustrates one example process for collecting and evaluating movement data to identify a user status according to one or more aspects described herein. The steps described with respect to FIG. 4 may be performed by one or more of the various devices and/or systems described herein, such as movement data evaluation and identification computing platform 110, movement data evaluation and identification server 210, mobile device 250, vehicle 260, remote user computing device 170, or the like. In some examples, one or more processes or steps described may be performed in real-time or near real-time and the capture, transmission, use and the like, of user data may be performed with user permission.

At step 400, a request for registration and/or an offer may be received. For instance, a request for registration or offer may be received from a mobile device, such as remote user computing device 170, by movement data evaluation and identification computing platform 110. In some examples, the request may include registration information such as user identifying information, mobile device identifying information, user contact information, user vehicle information, and the like.

At step 402, an application may be transmitted from the movement data evaluation and identification computing platform 110 to the mobile device (e.g., remote user computing device 170). In some examples, the application may be used to facilitate capture of data, transmission of data, processing of data, and the like.

At step 404, instructions to capture data may be generated. For instance, instructions to capture or collect data from one or more sources may be generated and transmitted to each source. In some examples, instructions to capture data may be transmitted to, for instance, a user vehicle (e.g., on board vehicle computing device), mobile device, internal computing systems (e.g., internal data computing system 120), external data computing systems (e.g., external data computing systems 140, 145), and the like. The instructions may include identification of a type of data to capture (e.g., movement data, device usage data, vehicle operational data, image data, user historical data, public transportation data, and the like). In some examples, the instruction may include a time period for which the data should be collected or captured.

At step 406, movement data may be received. For example, movement associated with movement of the mobile device may be received by the movement data evaluation and identification computing platform 110. The movement data may include movement over a predefined time period. The movement data may include location data (e.g., based on GPS) and may include or be used to identify speed of travel of the user in the vehicle.

At step 408, mobile device data may be received. For example, data from the user's mobile device (e.g., remote user computing device 170) may be received. In some examples, the mobile device data may include application data (e.g., data associated with applications executing on the mobile device and times when executing, time when applications are disabled/enabled, and the like). In some arrangements, the mobile device data may include available connection data. For instance, the mobile device data may include data associated with a number of devices available for pairing (e.g., via BLUETOOTH) at one or more times or during one or more time periods. In some examples, the mobile device data may include image data captured by an image capture device of the mobile device. The image data may include an image of a user and associated surroundings within the vehicle. Various other types of mobile device data may be received as well.

At step 410, vehicle data may be received. For instance, data from one or more vehicle sensors may be received from, for example, a vehicle associated with the user, a vehicle in which the user is travelling, or the like. In some examples, the vehicle data received may include vehicle operational data (e.g., engine RPM, speed, braking, swerving, acceleration, and the like). In some arrangements, the vehicle data received may include a notification of a particular user who unlocked the vehicle, started the vehicle, or the like. For instance, if facial or other biometric recognition, a mobile device, or the like, is used to unlock a vehicle, start a vehicle, or the like, the vehicle may transmit an identity of the user who unlocked or started the vehicle. Vehicle data may also include a mode in which the vehicle is operating. For instance, the vehicle data may include an indication of whether the vehicle is operating an autonomous mode, semi-autonomous mode, non-autonomous mode, or the like.

At step 412, other or additional data may be received. For example, other data from internal data sources (e.g., internal data computing system 120) may be received. Internal data may include user data, historical driving data of the user, and the like. Other data may also include external data. The external data may be received from one or more external data sources (e.g., external data computing system 140, external data computing system 145, or the like) and may include public transportation schedules and routes, weather conditions, traffic conditions, image data from infrastructure cameras, and the like.

At step 414, the received data may be aggregated and analyzed. In some examples, analyzing the data may include applying one or more weighting factors to the data. For instance, certain types of data may be weighted more heavily than others since there is greater confidence in the accuracy of determining whether the user is a driver or non-driver passenger based on the data. For instance, data indicating a mode in which a vehicle is operating may be weighted heavily since if in an autonomous mode there is high confidence that a user is a non-driver passenger. Alternatively, data associated with number of available connections may be weighted less heavily than vehicle mode because there is less confidence in the determination of whether the user is a driver or non-driver passenger based on that factor alone (e.g., few connections may mean that the user is surrounded by people with mobile devices turned off or with connection capability disabled). In some examples, each factor or type of data (e.g., vehicle mode, application usage, image data, and the like) may be associated with a weighting factor that may be used to weight the factor in arrangements in which more than one factor is used to determine a user status as driver or non-driver passenger.

Analyzing the data may include using machine learning to evaluate data, predict whether the user is a driver or non-driver passenger, or the like. In some examples, patterns, sequences, and the like, of data may be identified and used to determine the user status.

Analyzing the data may include comparing one or more patterns or routes to known public transportation routes and schedules to determine whether the driver is travelling on public transportation. Analyzing the data may include evaluating usage of one or more applications on the mobile device to determine when the applications were executing, what types of applications were executing, and the like. Analyzing the data may include comparing received image data to previously stored image data or known points of reference to determine a position of a user within the vehicle. Analyzing the data may include comparing the number of available connections to a threshold number (e.g., greater than 5, greater than 7, or the like) to determine whether the user is likely a passenger on public transportation. Analyzing the data may include various other factors and analysis without departing from the invention.

At step 416, a determination may be made as to whether, based on the analyzed data, the movement data corresponds to movement of a user as a driver of a vehicle. If not, the movement data, and/or other data may be deleted at step 418. As discussed herein, additionally or alternatively, if the movement data evaluation and identification computing platform 110 determines that the movement data corresponds to movement of a non-driver passenger, data may be processed to generate alternate outputs. For instance, the data may be processed with user preferences, user profile data, user subscription data, or the like to generate one or more outputs, such as a promotion, coupon, discount, or the like, from a partner entity (e.g., coffee shop, drug store, grocery store, or the like).

If, at step 416, the movement data corresponds to movement of a user as a driver of a vehicle, at step 420, the data may be further processed and/or analyzed to evaluate driving behaviors, vehicle operation, external factors (e.g., weather, time of day, and the like) to determine or adjust risk associated with the user as a driver. In some examples, a risk profile of the user may be generated or modified. The risk may then be used to determine or modify an insurance rate or premium, generate an insurance quote, determine a consumption rate of usage-based insurance, and the like, at step 422.

Although the arrangements described with respect to FIG. 4 include several different types of data received and used to determine a user status as a driver or non-driver passenger, in some examples, fewer types of data may be used to evaluate the movement data and determine a status of a user.

Figure 5:
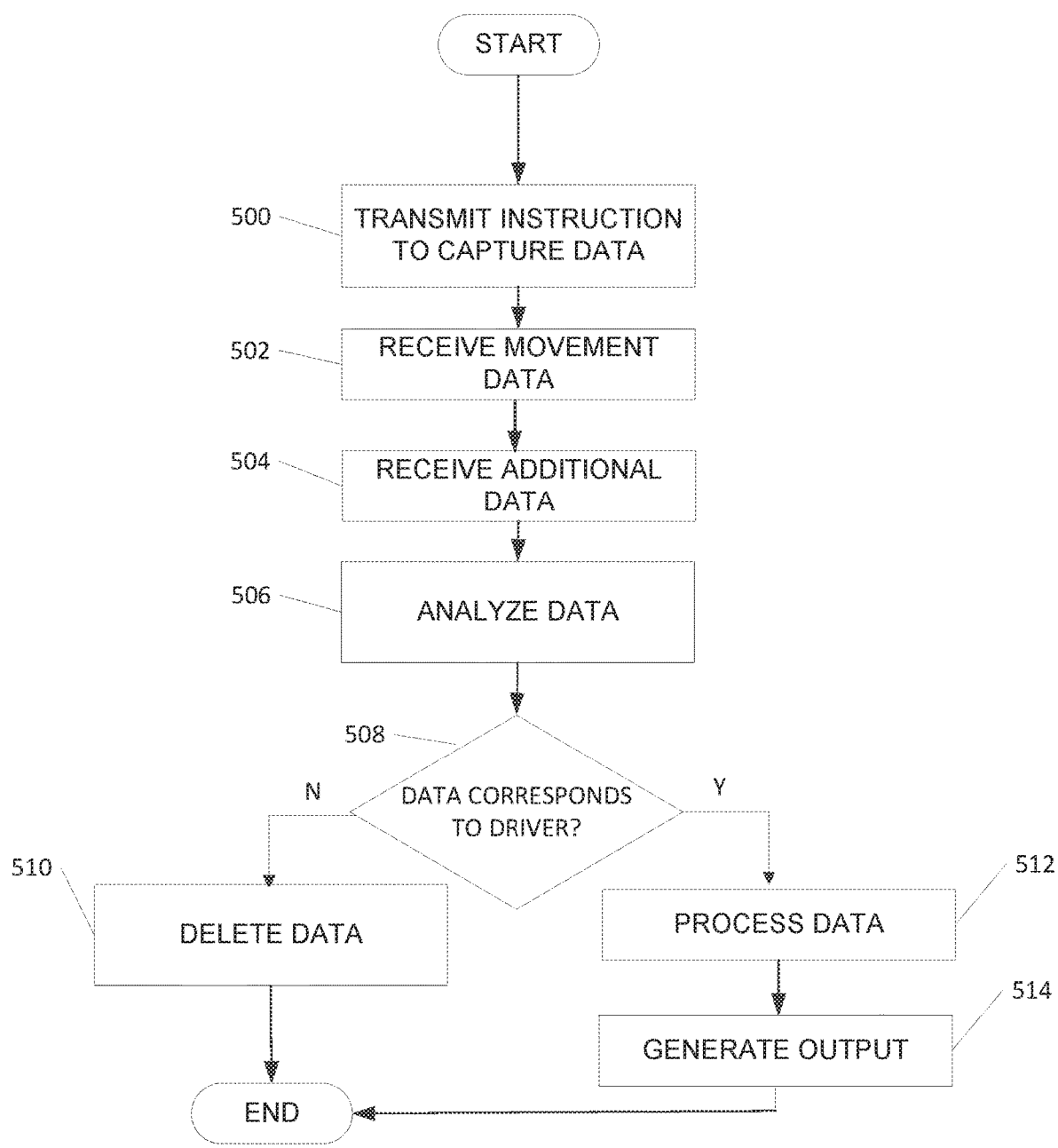
FIG. 5 illustrates one example flow chart illustrating an example method of movement data evaluation and identification functions, according to one or more aspects described herein.

For example, FIG. 5 illustrates another example process for collecting and evaluating movement data to identify a user status according to one or more aspects described herein. The steps described with respect to FIG. 5 may be performed by one or more of the various devices and/or systems described herein, such as movement data evaluation and identification computing platform 110, movement data evaluation and identification server 210, mobile device 250, vehicle 260, remote user computing device 170, or the like. In some examples, one or more processes or steps described may be performed in real-time or near real-time and the capture, transmission, use and the like, of user data may be performed with user permission.

The processes described with respect to FIG. 5 may be used following registration of a user, transmission of an application, and the like.

At step 500, an instruction to capture data may be generated and transmitted. In some examples, the instruction may be generated and transmitted from the movement data evaluation and identification computing platform 110 to the remote user computing device 170. The instruction may include identification of types of data to capture, such as movement data, device usage data, and the like.

At step 502, movement data may be received. For instance, movement data from one or more periods of time may be captured by sensors on the remote user computing device 170 and the data may be transmitted to the movement data evaluation and identification computing platform 110.

At step 504, additional data may be received. Additional data may include one or more types of data discussed herein. For example, additional data may include device usage data indicating applications executing on the mobile device during the one or more periods of time corresponding to the movement data, applications that enabled or disabled during the time period, and the like.

At step 506, the received data may be analyzed. For instance, applications or types or categories of applications executing on the mobile device may be evaluated to determine a likelihood that the user was a driver or non-driver passenger. For instance, if an application to pay for public transportation was executing on the mobile device at the time period corresponding to the movement data, the user is likely a non-driver passenger. In another example, if a ride share application was executing on the mobile device at the time period corresponding to the movement data, the user is likely a non-driver passenger. Various other types of determinations may be made based on applications, types of applications, or categories of applications executing on the mobile device.

At step 508, a determination may be made as to whether, based on the analyzed data, the movement data corresponds to movement of a user as a driver of a vehicle. If not, the movement data, and/or other data may be deleted at step 510. As discussed herein, additionally or alternatively, if the movement data evaluation and identification computing platform 110 determines that the movement data corresponds to movement of a non-driver passenger, data may be processed to generate alternate outputs. For instance, the data may be processed with user preferences, user profile data, user subscription data, or the like to generate one or more outputs, such as a promotion, coupon, discount, or the like, from a partner entity (e.g., coffee shop, drug store, grocery store, or the like).

If, at step 508, the movement data corresponds to movement of a user as a driver of a vehicle, at step 512, the data may be further processed and/or analyzed (and/or additional data may be retrieved) to evaluate driving behaviors, vehicle operation, external factors (e.g., weather, time of day, and the like) to determine or adjust risk associated with the user as a driver. In some examples, a risk profile of the user may be generated or modified. The risk may then be used to generate an output such as, determine or modify an insurance rate or premium, generate an insurance quote, determine a consumption rate of usage-based insurance, and the like, at step 514.

Figure 6:
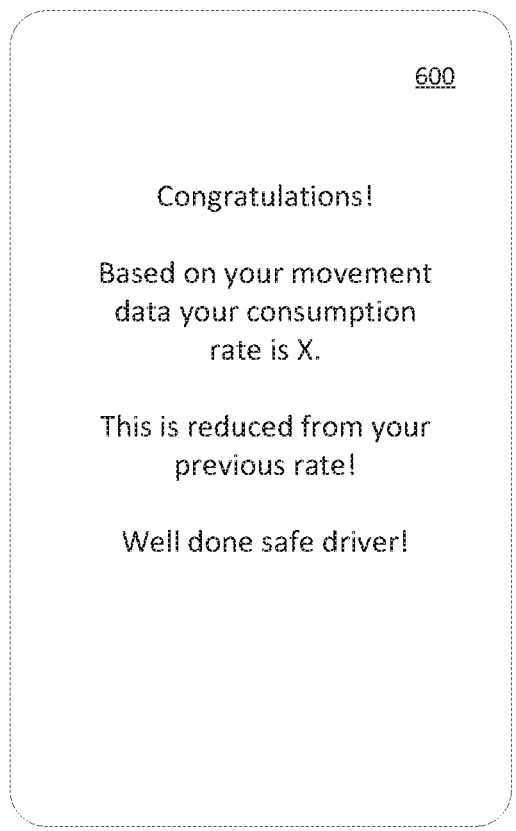
FIG. 6 illustrates an example user interface that may be generated according to one or more aspects described herein.

FIG. 6 illustrates one example user interface that may be generated according to one or more aspects described herein. The user interface 600 may be generated by, for example, movement data evaluation and identification computing platform 110 and transmitted to remote user computing device 170 for display. The notification may include an output generated based on analyzed movement data. For instance, the notification in user interface 600 includes an indication of a modified consumption rate for usage-based insurance. The interface 600 includes the new consumption rate and an indication that it has gone down which may imply an improvement in driving behaviors of the user.

Various other types of user interfaces and/or notifications may be generated and displayed without departing from the invention.

The various arrangements described herein can be used together or in combination with other arrangements. For instance, aspects described with respect to one figure may be used in combination with aspects described with respect to another figure, without departing from the invention.

Figure 7:
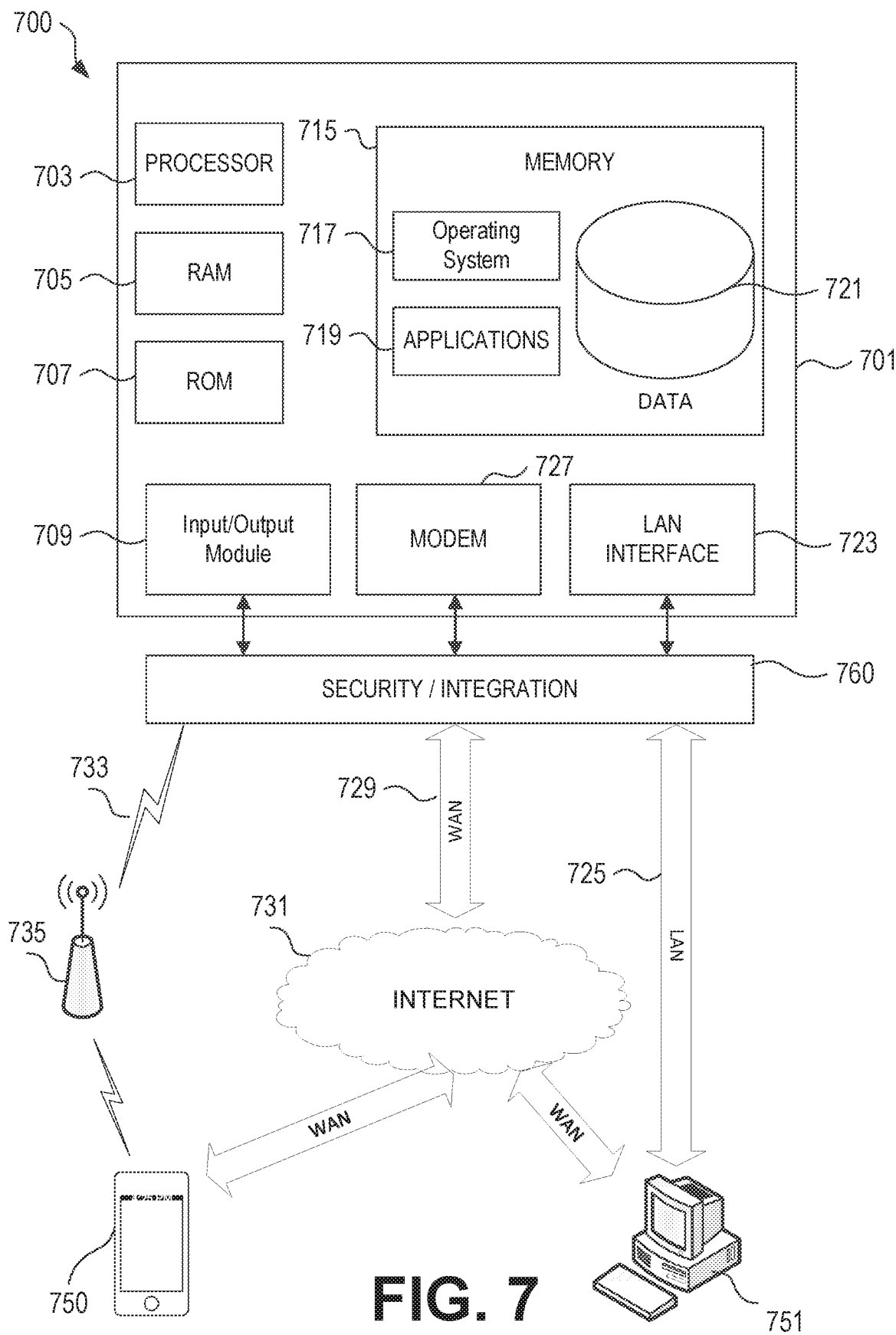
FIG. 7 illustrates a network environment and computing systems that may be used to implement aspects of the disclosure.

FIG. 7 illustrates a block diagram of a movement data evaluation and identification computing device (or system) 701 in a computer system 700 that may be used according to one or more illustrative embodiments of the disclosure. The computing device 701 may have a processor 703 for controlling overall operation of the movement data evaluation and identification computing device 701 and its associated components, including RAM 705, ROM 707, input/output module 709, and memory 715. The computing device 701, along with one or more additional devices (e.g., terminals 750 and 751, security and integration hardware 760) may correspond to any of multiple systems or devices, such as a user personal mobile computing device, computing platform, or a computer server, configured as described herein for capturing sensor data, transmitting or receiving data, analyzing data to determine a user status as driver or non-driver passenger, generating an output, deleting data, and the like.

Input/Output (I/O) 709 may include a microphone, keypad, touch screen, and/or stylus through which a user of the movement data evaluation and identification computing device 701 may provide input, and may also include one or more of a speaker for providing audio output and a video display device for providing textual, audiovisual and/or graphical output. Software may be stored within memory 715 and/or storage to provide instructions to processor 703 for enabling movement data evaluation and identification computing device 701 to perform various actions. For example, memory 715 may store software used by the movement data evaluation and identification computing device 701, such as an operating system 717, application programs 719, and an associated internal database 721. The various hardware memory units in memory 715 may include volatile and nonvolatile, removable and non-removable media implemented in any method or technology for storage of information such as computer readable instructions, data structures, program modules or other data. Certain devices/systems within movement data evaluation and identification computing system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 701 (e.g., a mobile computing device 701, movement data evaluation and identification computing platform 701, etc.), in order to receive and analyze data, determine a status of a user, generate one or more outputs, delete data, and the like. Memory 715 also may include one or more physical persistent memory devices and/or one or more non-persistent memory devices. Memory 715 may include, but is not limited to, random access memory (RAM) 705, read only memory (ROM) 707, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 703.

Processor 703 may include a single central processing unit (CPU), which may be a single-core or multi-core processor (e.g., dual-core, quad-core, etc.), or may include multiple CPUs. Processor(s) 703 may have various bit sizes (e.g., 16-bit, 32-bit, 64-bit, 96-bit, 128-bit, etc.) and various processor speeds (ranging from 100 MHz to 5 Ghz or faster). Processor(s) 703 and its associated components may allow the movement data evaluation and identification system 701 to execute a series of computer-readable instructions, for example, to receive sensor data and/or other data, analyze data, determine a status of a user based on analyzed data, generate one or more outputs, delete data, and the like.

The computing device (e.g., a mobile computing device, computing platform, server, external server, etc.) may operate in a networked environment 700 supporting connections to one or more remote computers, such as terminals 750 and 751. The terminals 750 and 751 may be personal computers, servers (e.g., web servers, database servers), or mobile communication devices (e.g., mobile phones, portable computing devices, on-board vehicle-based computing systems, and the like), and may include some or all of the elements described above with respect to the movement data evaluation and identification computing device 701. The network connections depicted in FIG. 7 include a local area network (LAN) 725 and a wide area network (WAN) 729, and a wireless telecommunications network 733, but may also include other networks. When used in a LAN networking environment, the movement data evaluation and identification computing device 701 may be connected to the LAN 725 through a network interface or adapter 723.

When used in a WAN networking environment, the device 701 may include a modem 727 or other means for establishing communications over the WAN 729, such as network 731 (e.g., the Internet). When used in a wireless telecommunications network 733, the device 701 may include one or more transceivers, digital signal processors, and additional circuitry and software for communicating with wireless computing devices 740 (e.g., mobile phones, portable computing devices, on-board vehicle-based computing systems, etc.) via one or more network devices 735 (e.g., base transceiver stations) in the wireless network 733.

Also illustrated in FIG. 7 is a security and integration layer 760, through which communications may be sent and managed between the device 701 (e.g., a user's personal mobile device, movement data evaluation and identification platform or server, etc.) and the remote devices (750 and 751) and remote networks (725, 729, and 733). The security and integration layer 760 may comprise one or more separate computing devices, such as web servers, authentication servers, and/or various networking components (e.g., firewalls, routers, gateways, load balancers, etc.), having some or all of the elements described above with respect to the movement data evaluation and identification computing device 701. As an example, a security and integration layer 760 of a mobile computing device, computing platform, or a server operated by an insurance provider, financial institution, governmental entity, or other organization, may comprise a set of web application servers configured to use secure protocols and to insulate the server 701 from external devices 750 and 751. In some cases, the security and integration layer 760 may correspond to a set of dedicated hardware and/or software operating at the same physical location and under the control of same entities as computing device 701. For example, layer 760 may correspond to one or more dedicated web servers and network hardware in an organizational datacenter or in a cloud infrastructure supporting a cloud-based data analysis system. In other examples, the security and integration layer 760 may correspond to separate hardware and software components which may be operated at a separate physical location and/or by a separate entity.

As discussed herein, the data transferred to and from various devices in the computing system 700 may include secure and sensitive data, such as device usage data, application usage data, vehicle data, insurance claim data, movement and location data, and the like. Therefore, it may be desirable to protect transmissions of such data by using secure network protocols and encryption, and also to protect the integrity of the data when stored on in a database or other storage in a mobile device, movement data evaluation and identification computing platform or server and other computing devices in the system 700, by using the security and integration layer 760 to authenticate users and restrict access to unknown or unauthorized users. In various implementations, security and integration layer 760 may provide, for example, a file-based integration scheme or a service-based integration scheme for transmitting data between the various devices in a system 700. Data may be transmitted through the security and integration layer 760, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 701 in the system 700 and/or the security and integration layer 760. The web services may be accessed by authorized external devices and users to support input, extraction, and manipulation of the data (e.g., device usage data, location data, movement data, vehicle data, etc.) between the various devices 701 in the system 700. Web services built to support system 700 may be cross-domain and/or cross-platform, and may be built for enterprise use. Such web services may be developed in accordance with various web service standards, such as the Web Service Interoperability (WS-I) guidelines. In some examples, a web service may be implemented in the security and integration layer 760 using the Secure Sockets Layer (SSL) or Transport Layer Security (TLS) protocol to provide secure connections between servers 701 and various clients 750 and 751 (e.g., mobile devices, data analysis servers, offer generation computing platform, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 760 may include specialized hardware for providing secure web services. For example, secure network appliances in the security and integration layer 760 may include built-in features such as hardware-accelerated SSL and HTTPS, WS-Security, and firewalls.

Such specialized hardware may be installed and configured in the security and integration layer 760 in front of the web servers, so that any external devices may communicate directly with the specialized hardware.

Although not shown in FIG. 7, various elements within memory 715 or other components in system 700, may include one or more caches, for example, CPU caches used by the processing unit 703, page caches used by the operating system 717, disk caches of a hard drive, and/or database caches used to cache content from database 721. For embodiments including a CPU cache, the CPU cache may be used by one or more processors in the processing unit 703 to reduce memory latency and access time. In such examples, a processor 703 may retrieve data from or write data to the CPU cache rather than reading/writing to memory 715, which may improve the speed of these operations. In some examples, a database cache may be created in which certain data from a database 721 (e.g., internal data database, external data database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of performing functions describes herein.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 719 may be used by the various computing devices 701 within movement data evaluation and identification computing system 700 (e.g., software applications, etc.), including computer executable instructions for receiving data, analyzing data, determining a status of a user based on analyzed data, generating one or more outputs, deleting data, and the like.

As discussed herein, aspects described are directed to a system, apparatus, method, computer-readable instructions, or the like, directed to capturing and analyzing movement data from a mobile to determine a status of the user of the mobile device as a driver or non-driver passenger when travelling in a vehicle. Aspects described herein may provide for improved accuracy in evaluating user driving behaviors for use in generating outputs such as insurance premiums (e.g., auto insurance, life insurance, or the like), consumption rates of usage based insurance, incentives or discounts, and the like.

Various examples of additional data captured and analyzed to determine a status of the user are provided below. These examples are merely some example arrangements that could be used with aspects described herein and other arrangements may be used without departing from the invention.

In one example arrangement, device usage data may be received from the mobile device associated with the movement data and the user. The device usage data may include applications executing on the device at particular times, categories or types of applications executing at particular times, patterns of device usage, applications enabled or disabled at particular times, and the like. In some examples, the particular times may correspond to one or more time periods for which movement data is being evaluated. Accordingly, the movement data evaluation and identification computing platform 110 may analyze the usage data to determine whether applications indicative of a user as a driver or non-driver passenger were executing at a time corresponding to the movement data in order to determine whether the user was a driver or non-driver passenger.

For instance, in some examples, the movement data evaluation and identification computing platform 110 may evaluate applications or types or categories of applications executing at a start of a driving trip (e.g., at a start of the movement data for the trip, at a known location such as a home address, work address, or the like). For instance, if a type of application, such as a ride share application, was executing at the start of the trip and/or through the duration of the trip, the system may identify the corresponding movement data as non-driver passenger. In another example, if payment was made via an application to a public transport agency at the start of the trip, the system may identify the movement data as non-driver passenger data.

Further, patterns of active (e.g., enabled) or disabled applications while in motion and during a time period corresponding to the movement data or a driving trip therein may be evaluated. For instance, if applications such as gaming applications, messaging applications, streaming services, website surfing, or the like, are executing during the time period corresponding to the movement data, the system may identify the data as non-driver passenger data. In some examples, a pattern of interaction with a mapping application may be different for a driver or a non-driver passenger. The system may evaluate a pattern of usage of the mapping application to determine a status of the user. In some examples, certain application may be automatically disabled based on a driver driving a vehicle. Accordingly, if those applications are disabled during a time period corresponding to the movement data, the system may identify the user as a driver for that time period.

In another example arrangement, the system may evaluate map, route, and/or motion patterns to determine a status of a user. For instance, in some examples, public transportation schedules and/or routes may be retrieved and stoppage points along the routes may be compared to stoppage points in the movement data or driving trips. If the schedule time corresponds to the movement data and the stoppage points correspond to the movement data the system may identify the user as a non-driver passenger because they are likely on public transportation. In some examples, the duration, frequency and location of stops may be considered to determine whether the user is a passenger on the public transportation or merely is in a vehicle following, for example, a bus.

In some arrangements, the pattern of travel time for the movement data or driving trip may be matched to published times or schedules of public transportation routes between two points to further aid in determining a status of the user. Additionally or alternatively, comparing a pattern of driving to known user driving patterns based on historical data may also aid in the determination of the status of the user.

In some examples, user driving patterns may be identified or determined from historical data or previously captured user data. Accordingly, those user driving patterns may be used as training data for machine learning systems to compare movement data driving patterns to determine whether it is likely the user is a driver or non-driver passenger. In some examples, users may directly provide input to a mobile device indicating driving patterns or habits, frequent trips, or the like.

In another example, the system may receive an indication of a mode in which the vehicle is operating. For instance, if the vehicle is in an autonomous mode, the system may identify the user as a non-driver passenger. In another arrangement, a user may provide input, either via a user interface of via voice input, stating whether he or she is a driver or non-driver passenger.

In another example arrangement, the system may receive data from the mobile device of a vehicle related to identity of a user who unlocked and/or started a vehicle. For instance, if a user relies on an application executing on a mobile device to unlock or start the vehicle, the mobile device may transmit an indication to the movement data evaluation and identification computing platform 110 indicating that the user associated with the mobile device unlocked or started the vehicle. In some examples, biometric data (e.g., facial recognition, fingerprint, iris scan, or the like) may be used to authenticate a user prior to unlocking or starting the vehicle and authentication data may also be transmitted. In some examples, a vehicle on-board computing device may provide similar unlocking and/or starting functions and may transmit indications of a user identity to the movement data evaluation and identification computing platform 110.

In still other examples, image data may be captured via an image capture device of the mobile device to determine a position of a user within a vehicle. For instance, the image data may be evaluated to determine a location of reference points such as a side window, headrest, seat belt or angle of seatbelt, B pillar of the vehicle, and the like. This information may then be used to determine a position of the user within the vehicle and a status of the user as a driver or non-driver passenger.

In some examples, image data captured by one or more infrastructure cameras (e.g., police cameras, red light cameras, or the like) or cameras from devices in other vehicles or with other passengers may be used to determine a status of the user. The image data, similar to other types of data, may be used with the permission of the user.

In still other arrangements, a pattern of mobile device movement during travel may be evaluated. For instance, if movement data of the mobile device indicates the device is mounted to a dashboard of the vehicle rather than changing position or relative position, the system may determine that the user is likely a driver rather than a non-driver passenger.

In other examples, the movement data evaluation and identification computing platform 110 may receive data associated with a number of other paired or unpaired devices available for pairing (e.g., via BLUETOOTH) while in motion. If the number of available devices is greater than a threshold number, the system may determine that it is likely the user is on public transportation and thus is a non-driver passenger.

The example arrangements discussed herein may be used in isolation or in combination to evaluate movement data to determine a status of a user. As discussed above, in some examples, different factors may be associated with different weighting scores.

In some arrangements, a score may be determined based on the one or more factors being used to evaluate the movement data. For instance, each factor may be scored based on a likelihood of a user being a driver or non-driver passenger. Any weighting factors may be multiplied by the respective score and the weighted scores may be summed to determine an overall score. If the overall score is above a particular threshold, the system may identify the user as a driver. If below, the system may identify the user as a non-driver passenger.

In some examples, the data may be captured and/or analyzed in real-time or near real-time.

In other examples, the data may be captured and analyzed at predetermined intervals (e.g., weekly, monthly, or the like) to adjust usage based insurance rates.

In addition to generating the outputs described herein, the system may be used to generate targeted advertising for entities. In other examples, the system may be used to alert the driver to hazardous situations, automatically modify operation of the vehicle, such as changing an operating mode of the vehicle, turning on hazards, block one or more applications from executing on a mobile device based on the user status as a driver, or the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. Furthermore, such aspects may take the form of a computer program product stored by one or more computer-readable storage media having computer-readable program code, or instructions, embodied in or on the storage media. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

Various aspects described herein can be embodied as a method, an apparatus, or as one or more computer-readable media storing computer-executable instructions. Accordingly, those aspects can take the form of an entirely hardware embodiment, an entirely software embodiment, or an embodiment combining software and hardware aspects. Any and/or all of the method steps described herein can be embodied in computer-executable instructions stored on a computer-readable medium, such as a non-transitory computer readable medium. Any and/or all of the method steps described herein can be embodied in computer-readable instructions stored in the memory of an apparatus that includes one or more processors, such that the apparatus is caused to perform such method steps when the one or more processors execute the computer-readable instructions. In addition, various signals representing data or events as described herein can be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures can be performed in other than the recited order, and that one or more steps illustrated can be optional in accordance with aspects of the disclosure. Further, one or more aspects described with respect to one figure or arrangement can be used in conjunction with other aspects associated with another figure or portion of the description.

The invention claimed is:

1. A computing platform, comprising:
   a processing unit comprising a processor; and
   a memory unit storing computer-executable instructions, which when executed by the processing unit, cause the computing platform to:
      receive, from at least an accelerometer associated with a mobile device, sensor data associated with movement of the mobile device during a first time period, the first time period corresponding to a trip of a vehicle having a starting point, a destination, and travel between the starting point and the destination;
      identify a plurality of applications executing on the mobile device during the first time period, each application of the plurality of applications having a category associated therewith;
      receive usage data associated with one or more applications of a first category executing on the mobile device during the first time period;
      analyze the received sensor data and the received usage data to determine whether the movement of the mobile device corresponds to a user of the mobile device being a driver of the vehicle during the trip of the vehicle or the user of the mobile device being a non-driver passenger of the vehicle during the trip of the vehicle;
      responsive to determining that the movement of the mobile device corresponds to the user being a driver of the vehicle during the trip of the vehicle, analyze at least one of: the received sensor data and the received usage data to evaluate driving behaviors of the user associated with operation of the vehicle and generate a first output, including a first offer for a product or service, associated with the driving behaviors of the user; and
      responsive to determining that the movement of the device corresponds to the user being a non-driver passenger of the vehicle during the trip of the vehicle, generate a second output including a second offer for a product or service, different from the first output, and associated with a user profile of the user.

2. The computing platform of claim 1, further including instructions that, when executed, cause the computing platform to:
   receive, from the mobile device, image data including an image of the user,
   wherein analyzing the received sensor data and the received usage data further includes analyzing the image data including comparing the received image data to pre-stored image data to determine a position of the user within the vehicle.

3. The computing platform of claim 1, further including instructions that, when executed, cause the computing platform to:
   receive, from one or more external computing systems, public transportation schedules and routes,
   wherein analyzing the received sensor data and the received usage data further includes analyzing the public transportation schedules and routes including comparing stoppage points within received sensor data to public transportation stops identified from the public transportation schedules and routes.

4. The computing platform of claim 1, further including instructions that, when executed, cause the computing platform to:
   receive, from an on-board vehicle computing device, data indicating an identity of a user performing at least one of: unlocking the vehicle and starting the vehicle,
   wherein analyzing the received sensor data and the received usage data further includes analyzing the data indicating the identity of the user performing at least one of: unlocking the vehicle and starting the vehicle including comparing the identity of the user performing one of: unlocking the vehicle and starting the vehicle to the user of the mobile device.

5. The computing platform of claim 1, further including instructions that, when executed, cause the computing platform to:
receive, from an on-board vehicle computing device, data indicating an operating mode of the vehicle,
wherein analyzing the received sensor data and the received usage data further includes analyzing the data indicating the operating mode of the vehicle including determining whether the operating mode is an autonomous operating mode.

6. The computing platform of claim 1, further including instructions that, when executed, cause the computing platform to:
receive-additional data from a plurality of sources,
wherein analyzing the received sensor data and the received usage data further includes analyzing the additional data from the plurality of sources including applying a weighting factor to different types of data in the data from the plurality of sources.

7. One or more non-transitory computer-readable media storing computer-executable instructions that, when executed by a computing device, cause the computing device to:
receive, from at least an accelerometer associated with a mobile device, sensor data associated with movement of the mobile device during a first time period, the first time period corresponding to a trip of a vehicle having a starting point, a destination, and travel between the starting point and the destination;
identify a plurality of applications executing on the mobile device during the first time period, each application of the plurality of applications having a category associated therewith;
receive usage data associated with one or more applications of a first category executing on the mobile device during the first time period;
analyze the received sensor data and the received usage data to determine whether the movement of the mobile device corresponds to a user of the mobile device being a driver of the vehicle during the trip of the vehicle or the user of the mobile device being a non-driver passenger of the vehicle during the trip of the vehicle;
responsive to determining that the movement of the mobile device corresponds to the user being a driver of the vehicle during the trip of the vehicle, analyze at least one of: the received sensor data and the received usage data to evaluate driving behaviors of the user associated with operation of the vehicle and generate a first output, including a first offer for a product or service, associated with the driving behaviors of the user; and
responsive to determining that the movement of the device corresponds to the user being a non-driver passenger of the vehicle during the trip of the vehicle, generate a second output, including a second offer for a product or service, different from the first output, and associated with a user profile of the user.

8. The one or more non-transitory computer-readable media of claim 7, further including instructions that, when executed, cause the computing device to:
receive, from the mobile device, image data including an image of the user,
wherein analyzing the received sensor data and the received usage data further includes analyzing the image data including comparing the received image data to pre-stored image data to determine a position of the user within the vehicle.

9. The one or more non-transitory computer-readable media of claim 7, further including instructions that, when executed, cause the computing device to:
receive, from one or more external computing systems, public transportation schedules and routes,
wherein analyzing the received sensor data and the received usage data further includes analyzing the public transportation schedules and routes including comparing stoppage points within the received sensor data to public transportation stops identified from the public transportation schedules and routes.

10. The one or more non-transitory computer-readable media of claim 7, further including instructions that, when executed, cause the computing device to:
receive, from an on-board vehicle computing device, data indicating an identity of a user performing at least one of: unlocking the vehicle and starting the vehicle, and wherein analyzing the received sensor data and the received usage data further includes analyzing the data indicating the identity of the user performing at least one of: unlocking the vehicle and starting the vehicle including comparing the identity of the user performing one of: unlocking the vehicle and starting the vehicle to the user of the mobile device.

11. The one or more non-transitory computer-readable media of claim 7, further including instructions that, when executed, cause the computing device to:
receive, from an on-board vehicle computing device, data indicating an operating mode of the vehicle, and wherein analyzing the received sensor data and the received usage data further includes analyzing the data indicating the operating mode of the vehicle including determining whether the operating mode is an autonomous operating mode.

12. The one or more non-transitory computer-readable media of claim 7, further including instructions that, when executed, cause the computing device to:
receive additional data including data from a plurality of sources, and wherein analyzing the received sensor data and the received usage data further includes analyzing the additional data including applying a weighting factor to different types of data in the data from the plurality of sources.

13. A method, comprising:
by a computing device having at least one processor, a communication interface and a memory storing instructions that, when executed by the at least one processor, cause the processor to:
receiving, from at least an accelerometer associated with a mobile device, by the at least one processor and via the communication interface, sensor data associated with movement of the mobile device during a first time period, the first time period corresponding to a trip of a vehicle having a starting point, a destination, and travel between the starting point and the destination;
identifying, by the at least one processor, a plurality of applications executing on the mobile device during the first time period, each application of the plurality of applications having a category associated therewith;

receiving, by the at least one processor and via the communication interface, usage data associated with one or more applications of a first category executing on the mobile device during the first time period;

analyzing, by the at least one processor, the received sensor data and the received usage data to determine whether the movement of the mobile device corresponds to a user of the mobile device being a driver of the vehicle during the trip of the vehicle or the user of the mobile device being a non-driver passenger of the vehicle during the trip of the vehicle;

if it is determined that the movement of the mobile device corresponds to the user being a driver of the vehicle during the trip of the vehicle, analyzing, by the at least one processor, at least one of: the received sensor data and the received usage data to evaluate driving behaviors of the user associated with operation of the vehicle and generating a first output, including a first offer for a product or service, associated with the driving behaviors of the user; and if it is determined that the movement of the device corresponds to the user being a non-driver passenger of the vehicle during the trip of the vehicle, generating a second output, including a second offer for a product or service, different from the first output, and associated with a user profile of the user.

14. The method of claim 13, further including:

receiving, by the at least one processor and from the mobile device, image data including an image of the user, wherein analyzing the received sensor data and the received usage data further includes analyzing the image data including comparing the received image data to pre-stored image data to determine a position of the user within the vehicle.

15. The method of claim 13, further including:

receiving, by the at least one processor and -from one or more external computing systems, public transportation schedules and routes, wherein analyzing the received sensor data and the received usage data further includes analyzing the public transportation schedules and routes including comparing stoppage points within the received sensor data to public transportation stops identified from the public transportation schedules and routes.

16. The method of claim 13, further including:

receiving, by the at least one processor and from an on-board vehicle computing device, data indicating an identity of a user performing at least one of: unlocking the vehicle and starting the vehicle, and wherein analyzing the received sensor data and the received usage data further includes analyzing the identity of the user performing at least one of: unlocking the vehicle and starting the vehicle including comparing the identity of the user performing one of: unlocking the vehicle and starting the vehicle to the user of the mobile device.

17. The method of claim 13, further including:

receiving, by the at least one processor and from an on-board vehicle computing device, data indicating an operating mode of the vehicle, wherein analyzing the received sensor data and the received usage data further includes analyzing the data indicating an operating mode of the vehicle including determining whether the operating mode is an autonomous operating mode.

\* \* \* \* \*